United States Patent
Wada

(10) Patent No.: US 8,355,101 B2
(45) Date of Patent: Jan. 15, 2013

(54) LIQUID CRYSTAL DEVICE AND ELECTRONIC APPARATUS

(75) Inventor: Hiroshi Wada, Azumino (JP)

(73) Assignee: Sony Corporation, Tokyo (JP)

( * ) Notice: Subject to any disclaimer, the term of this patent is extended or adjusted under 35 U.S.C. 154(b) by 809 days.

(21) Appl. No.: 11/979,001

(22) Filed: Oct. 30, 2007

(65) Prior Publication Data

US 2008/0204640 A1  Aug. 28, 2008

(30) Foreign Application Priority Data

Feb. 22, 2007  (JP) .................................. 2007-041815

(51) Int. Cl.
*G02F 1/1337* (2006.01)
*G02F 1/1333* (2006.01)
*G02F 1/1343* (2006.01)

(52) U.S. Cl. .................. 349/114; 349/126; 349/141

(58) Field of Classification Search .................. 349/114, 349/126, 141
See application file for complete search history.

(56) References Cited

U.S. PATENT DOCUMENTS

| | | | |
|---|---|---|---|
| 6,762,809 B1 | 7/2004 | Murade | |
| 2005/0264731 A1* | 12/2005 | Itou et al. | 349/114 |
| 2006/0044496 A1* | 3/2006 | Tsuchiya | 349/114 |
| 2007/0165169 A1* | 7/2007 | Jang et al. | 349/134 |

FOREIGN PATENT DOCUMENTS

| | | |
|---|---|---|
| JP | A-9-211461 | 8/1997 |
| JP | A-2001-042332 | 2/2001 |
| JP | A-2001-166312 | 6/2001 |
| JP | A 2005-338256 | 12/2005 |

* cited by examiner

*Primary Examiner* — Jessica M Merlin
(74) *Attorney, Agent, or Firm* — K&L Gates LLP

(57) ABSTRACT

A liquid crystal device includes a first substrate and a second substrate facing each other, a liquid crystal layer disposed between the first substrate and the second substrate, an aligning film which is disposed on a liquid crystal layer side surface of the second substrate and on which a rubbing processing is performed, a plurality of sub-pixels arranged in planar regions of the first substrate and the second substrate, a first electrode and a second electrode which are disposed on a liquid crystal layer side surface of the first substrate and which generate an electric field therebetween, in which the second electrode includes a plurality of electrode line-shaped portions arranged in parallel to each other and spaced apart from each other, each sub-pixel includes a reflective display region in which a light reflective film is disposed and a transmissive display region in which a light reflective film is not disposed.

17 Claims, 14 Drawing Sheets ial Field
LIQUID CRYSTAL DEVICE AND ELECTRONIC APPARATUS

The entire disclosure of Japanese Patent Application No. 2007-041815, filed Feb. 22, 2007 is expressly incorporated by reference herein.

BACKGROUND

1. Technical Field

The present invention relates to a liquid crystal device which generates an electric field between two electrodes disposed on one substrate, and more particularly, to a liquid crystal device which can selectively perform a reflective type display and a transmissive type display. The present invention further provides an electronic apparatus having a structure including the liquid crystal device.

2. Related Art

Currently, liquid crystal devices (LCDs) are widely used in applications of electronic apparatuses, such as a cellular phone, a personal digital assistant (PDA), and a car navigation system. For example, the LCD is used as a displaying portion of an electronic apparatus, which displays a variety of information associated with the electronic apparatus in an image form. There are known a longitudinal electric field type LCD and a lateral electric field type LCD.

A representative longitudinal electric field type LCD is a twisted nematic type LCD (TN-type LCD) having a structure in which a liquid crystal layer is interposed between a pair of opposing substrates, the substrates are provided with corresponding electrodes, respectively, and a voltage is applied to the electrodes so as to generate an electric field acting in a direction perpendicular to the substrates. The longitudinal electric field type LCD controls the orientation of liquid crystal molecules in the liquid crystal layer using the longitudinal electric field, thereby modulating light passing through the liquid crystal layer.

On the other hand, the lateral electric field type LCD has a structure in which a liquid crystal layer is interposed between a pair of opposing substrates, two electrodes (a shared electrode and a pixel electrode) are disposed on either one of the substrates, and a voltage is applied to the two electrodes so as to generate an electric field (lateral electric field) acting in a direction parallel to the substrates or at an angle to the substrates. The lateral electric field type LCD controls the orientation of liquid crystal molecules in the liquid crystal layer using the lateral electric field, thereby modulating light passing through the liquid crystal layer.

In the lateral electric field type LCD, liquid crystal molecules are driven by the electric field acting in a direction parallel to or at an angle to the substrates. Accordingly, the orientation of the liquid crystal molecules is controlled within a plane which is almost parallel to the substrates, and thus a viewing angle to the liquid crystal molecules is not changed even if a viewing angle to the LCD is changed. As a result, the lateral electric field type LCD has a characteristic that a display performed based on the control of the orientation of the liquid crystal molecules can be viewed at a viewing angle in a wide range. This characteristic is termed "a viewing angle of an LCD is wide" or "an LCD has a wide viewing angle."

As for the above-mentioned lateral electric field type LCD, a transflective LCD which can perform both a reflective type display and a transmissive type display is known. The transmissive type display is a display technique in which a display is performed using light passed through a liquid crystal layer one time and the reflective type display is a display technique in which a display is performed using light passed through the liquid crystal layer two times, that is, in this technique, light first passes the liquid crystal layer, is then reflected from a light reflective film, and finally passes the liquid crystal layer again. The transflective type display is a display technique in which the reflective type display and the transmissive type display are selectively performed. The transflective type LCD includes a reflective display region and a transmissive display region in one sub-pixel and shifts its operation modes from a reflective mode to a transmissive mode or from the transmissive mode to the reflective mode according to brightness of environment. By such a technique, the transflective type LCD can display a clear image even in a dark place at low power consumption.

Further in the transflective type LCD, optimum retardation values for the reflective display region and the transmissive display region are different from each other, and the liquid crystal layer is designed so as to have different layer thicknesses in the reflective display region and the transmissive display region. In greater detail, a layer thickness adjusting film is disposed in the reflective display region so that a layer thickness of the liquid crystal layer in the reflective display region is smaller than that of transmissive display region (Refer to JP-A-2005-338256).

In an LCD disclosed in JP-A-2005-338256 (Claims 6 to 7 and FIG. 2), a short edge of a layer thickness adjusting film, i.e. a boundary portion of a reflective display region and a transmissive display region, has a step plane. The step plane is an inclined plane which is naturally produced when the layer thickness adjusting film is patterned. An aligning force which aligns liquid crystal molecules becomes weak near the step plane and there is a probability that the alignment of the liquid crystal molecules is failed. In particular, in the lateral electric filed type LCD, liquid crystal molecules revolve in the plane parallel to the surface of the substrate when an electric field is generated by voltage application. After that, even after the electric field is extinguished, there is a probability that it is difficult for the liquid crystal molecules to recover their initial alignment state in the step plane where the aligning force is weak. As a result, the step plane, i.e. the boundary portion of the reflective display region and the transmissive display region, has failure in the alignment of liquid crystal molecules, resulting in decrease in display contrast. JP-A-2005-338256 explains the reason such that the relationship between the step plane and the direction of alignment processing are not adequately set.

SUMMARY

An advantage of some aspects of the invention is that it provides a liquid crystal device (LCD) which is lateral electric field type and transflective type, and an electronic apparatus using the LCD. The LCD and the electronic apparatus using the LCD have an advantageous effect in that it is possible to prevent alignment failure from occurring at a boundary portion of a reflective display region and a transmissive display region by properly setting the relationship between a direction of an electric field, a step plane of a layer thickness adjusting film, and a direction of alignment processing, and further it is possible to prevent display contrast from deteriorating.

A first aspect of the invention provides an LCD including a first substrate and a second substrate facing each other, a liquid crystal layer disposed between the first substrate and the second substrate, an aligning film disposed on the liquid crystal layer side surface of the second substrate, on which rubbing processing is performed, a plurality of sub-pixels arranged in planar regions of the first substrate and the second substrate, and a first electrode and a second electrode disposed on the liquid crystal layer side surface of the first substrate in order to generate an electric field therebetween, in which the second electrode includes a plurality of electrode line-shaped portions parallel to each other and spaced apart from each other, each sub-pixel includes a reflective display region in which a light reflective layer is disposed and a transmissive display region in which the light reflective layer is not disposed, a layer thickness adjusting film is disposed between the second substrate and the aligning film in order to make the liquid crystal layer have different layer thicknesses in the reflective display region and in the transmissive display region, and the layer thickness adjusting film has a step portion having a step plane extending in the layer thickness direction of the layer thickness adjusting film at a boundary portion of the reflective display region and the transmissive display region. In the LCD, it is preferable that when an angle of a direction of the rubbing processing to an extending direction of the step plane is defined as α, $0° \leq \alpha \leq 20°$. On the other hand, in the transmissive display region, the rubbing direction is set in a manner such that ends of liquid crystal molecules, which are disposed at a leading end position in the rubbing direction, align so as to direct toward the step plane when a voltage is applied across the first electrode and the second electrode.

The LCD is a lateral electric field type LCD which drives liquid crystals by applying an electric field generated in a direction almost parallel to a surface of a substrate to the liquid crystals. It is known that the lateral electric field type LCD operates in either in-plane switching mode (IPS mode) or fringe field switching mode (FFS mode). The IPS mode is performed in a structure in which the first electrode and the second electrode do not overlap each other in a plan view. On the other hand, in the FFS mode, it is possible to generate an electric field acting in a layer thickness direction of the liquid crystal layer as well as a lateral electric field parallel to the substrate. Further, it is possible to form an electric storage capacitor between the first electrode and the second electrode. Thanks to such a structure, it is possible to construct a FFS mode LCD having advantages of wider viewing angle, higher contrast, and lower voltage in comparison with the IPS mode.

The electro-optical device is a transflective type electro-optical device and has a multi-gap structure. The transflective type LCD includes a transmissive display region and a reflective display region in one sub-pixel. The reflective display region has a light reflective film therein and performs a reflective type display using light reflected from the light reflective film. On the other hand, the transmissive region does not have the light reflective film and thus performs a transmissive type display using light passing through out one substrate and then reaching the other substrate. The LCD according to the invention can selectively perform a transmissive type display and a reflective type display by using either the reflective display region or the transmissive display region.

In the LCD, it is preferable that the layer thickness adjusting film is designed so as to impart different optimum retardations to the reflective display region and the transmissive display region. The step plane of the layer thickness adjusting film is a plane inclined in a layer thickness direction. The step plane is naturally formed in an inclined plane form, when the layer thickness adjusting film is patterned by a photolithography process. This inclined plane is formed in a manner such that a layer thickness of the layer thickness adjusting film continuously changes. That is, a section of the layer thickness adjusting film has a taper to a layer thickness direction.

The liquid crystal molecules in the liquid crystal layer are aligned by alignment processing, for example rubbing processing, which is performed with respect to the aligning films disposed on the first and second substrates, respectively. The rubbing processing is performed using a roller having a cylindrical shape wound by rubbing cloth. In greater detail, the rubbing processing is performed by rubbing the rubbing cloth wound around the surface of the roller against the surface of the aligning films while the roller is rotating by moving the rotating roller in a predetermined direction on the surface of the aligning films. In this specification of the present application, terms "leading side in a direction in which rubbing processing is performed" mean a position where the rubbing cloth which rubs the surface of the aligning film is separated from the surface of the aligning film, i.e. where the rubbing processing ends. Hereinafter, this can be also termed "rubbing-end side."

By the rubbing processing, the liquid crystal molecules turn to splay alignment state (i.e. in initial alignment state) in which the liquid crystal molecules splay out from the surface of the aligning film at a predetermined angle when an electric field is not applied to the liquid crystal layer. In the initial alignment state, ends of the liquid crystal molecules which are disposed on the rubbing-end side (leading side in rubbing direction), are in the state of being separated from the surface of the aligning film by the pre-tilt alignment. If an electric field is applied to the liquid crystals in the pre-tilt alignment state, the ends of the liquid crystal molecules, which are separated from the surface of the aligning film, i.e. the ends of the liquid crystal molecules which are on the rubbing-end side in the rubbing direction, move.

In the LCD according to the first aspect, it is preferable that the relationship between a direction of the electric field, an extending direction of the step plane, and a direction of the rubbing processing (rubbing direction) are set as follows: (1) the rubbing processing with respect to the aligning film is not performed in a direction parallel to the step plane or in a direction in which it goes away from the step plane and an angle α between a rubbing direction and an extending direction of the step plane is in the range expressed by $0° \leq \alpha \leq 20°$; and (2) the rubbing direction is a direction in which the ends of the liquid crystal molecules, which are on the rubbing-end side, move toward the step plane when a voltage is applied across the first electrode and the second electrode.

When the above-mentioned conditions (1) and (2) are satisfied, the liquid crystal molecules are aligned at an angle in the range from 0° to 20° to the extending direction of the step plane in the initial alignment state. Accordingly, it is preferable that the step plane is disposed at a leading side in movement direction of the ends of the liquid crystal molecules, which are separated from the surface of the aligning film (the ends on the rubbing-end side). As a result, it is possible to regulate the movement of the liquid crystal molecules existing near the step plane by the step plane, and thus it is possible to regulate the movement of the liquid crystal molecules existing near the step plane on which aligning force is weak at the time of generating an electric field between the first electrode and the second electrode. For this reason, when the liquid crystal molecules turn to the state in which the electric field is not applied, it becomes easy for the liquid crystal molecules near the step plane to return to the initial alignment state and alignment failure negligibly occurs near the step plane. As a result, it is possible to prevent display contrast from deteriorating attributable to weak aligning force on the step plane.

In the LCD, it is preferable that the liquid crystals have a positive dielectric anisotropy, the transmissive display region and the reflective display region are arranged in a longitudinal direction of the sub-pixel, and the extending direction of the electrode line-shaped portions has an angle to a lateral direction of the sub-pixel when it is viewed from the liquid crystal layer side, in which the angle is in the range from 0° to 45° in clockwise direction or in the range from 0° to 45° in counterclockwise direction. In this embodiment, since the transmissive display region and the reflective display region are arranged in the longitudinal direction of the sub-pixel, it is possible to allow the step plane to extend in the lateral direction of the sub-pixel. For this reason, it is easy to form the step plane.

Further, the liquid crystals having a positive dielectric anisotropy are aligned in a direction parallel to a direction of the electric field in the state in which they are applied with the electric field. In this embodiment, since the electrode line-shaped portions of the second electrode and gaps extend in the lateral direction of the sub-pixel, a direction of the electric field generated between the first electrode and the second electrode is the same as the longitudinal direction of the sub-pixel. Accordingly, the liquid crystals on the second substrate are in contact with the step plane extending in the lateral direction at the ends thereof, which move when the voltage is applied. As a result, it is easy for the liquid crystal molecules near the step plane to turn to the initial alignment state when the liquid crystals turn to the state in which the electric field is not applied, and it is possible to prevent display contrast from deteriorating attributable to weak aligning force on the step plane.

In the LCD, it is preferable that when an angle between the rubbing direction and the extending direction of the electrode line-shaped portions is defined as $\beta$, $5°\leq\alpha\leq25°$, and when an angle between the rubbing direction and the extending direction of the step plane is defined as $\alpha$, $\alpha\neq0°$. For this instance, it is preferable that the rubbing processing is performed in a direction from an opposing side of the step plane to the step plane.

In the LCD, by setting the angle $\beta$ between the rubbing direction and the extending direction of the electrode line-shaped portions to be in the range expressed by $5°\leq\alpha\leq20°$, it is possible to stabilize the alignment change of the liquid crystal molecules during a voltage application period and to reduce a threshold voltage at which alignment states change. Since the angle $\alpha$ between the rubbing direction and the extending direction of the step plane is not 0° (the rubbing direction is not parallel to the step plane), ends of the liquid crystal molecules, which move when a voltage is applied, come into contact with the step plane. As a result, when the liquid crystal molecules turn to the state in which an electric field is not applied, the liquid crystal molecules near the step plane easily turn to the initial alignment state and it is possible to prevent display contrast from deteriorating attributable to weak aligning force on the step plane.

Next, in the LCD in which the angle $\alpha$ between the step plane and the rubbing direction is not 0°, it is preferable that the transmissive display region and the reflective display region are arranged in the longitudinal direction of the sub-pixel and the step plane and the electrode line-shaped portions extend in a direction parallel to the lateral direction of the sub-pixel. The step plane and the electrode line-shaped portions are parallel to each other.

In the LCD, the relationship between the direction of electric field, the extending direction of the step plane, and the rubbing direction is set so as to satisfy the above-mentioned conditions (1) and (2). Accordingly, since the movement of liquid crystal molecules existing near the step plane can be regulated by the step plane, the movement of the liquid crystal molecules is limited to a small amount when an electric field is generated between the shared electrode and the pixel electrode. As a result, when the operation state of the LCD changes to the state in which an electric field is not applied, the liquid crystal molecules near the step plane easily turn to the initial alignment state and it is possible to prevent display contrast from deteriorating attributable to weal aligning force on the step plane.

Next, in the LCD, when the rubbing direction and the extending direction of the electrode line-shaped portions have an angle $\beta$ to each other, the angle $\alpha$ is in the range expressed by $5°\leq\alpha\leq25°$. When the angle between the rubbing direction and the extending direction of the step plane is defined as $\alpha$, $\alpha=0°$.

With the structure, it is possible to stabilize change of alignment state of the liquid crystal molecules when a voltage is applied by setting the angle $\beta$ between the rubbing direction and the extending direction of the electrode line-shaped portions to be in the range expressed by $0°\leq\alpha\leq20°$. Further, since the angle $\alpha$ between the rubbing direction and the extending direction of the step plane is 0° (i.e. the rubbing direction is parallel to the step plane), ends of the liquid crystal molecules, which move when a voltage is applied, easily come into contact with the step plane. As a result, when the operation state of the LCD changes to the state in which an electric field is not applied, the liquid crystal molecules near the step plane easily turn to the initial alignment state and it is possible to prevent display contrast from deteriorating attributable to weak aligning force on the step plane.

Next, in the LCD, it is preferable that an angle $\delta$ between the electrode line-shaped portions and the lateral direction of the sub-pixel is 0°, an angle $\in$ between the extending direction of the electrode line-shaped portions and the extending direction of the step plane is in the range expressed by $5°\leq\in\leq20°$, and the angle $\alpha$ between the rubbing direction and the extending direction of the step plane is 0°. In the LCD, the relationship between the directions of electric field, the step plane, and the rubbing direction satisfy the conditions (1) and (2). Accordingly, since it is possible to regulate the movement of the liquid crystal molecules near the step plane by the step plane, it is possible to limit the movement of the liquid crystal molecules to a small amount when an electric field is generated between the shared electrode and the pixel electrode. As a result, the operation state of the LCD changes to the state in which an electric filed is not applied, the liquid crystal molecules near the step plane easily turn to the initial alignment state and it is possible to prevent display contrast from deteriorating attributable to weak aligning force on the step plane.

In the LCD, the angle $\alpha$ between the rubbing direction and the extending direction of the step plane is 0°. By this setting, it is more securely performing alignment processing with respect to the aligning film on the step plane than the case in which the rubbing processing is performed in a direction at an angle to the extending direction of the step plane. As a result, since it is possible to increase aligning force on the step plane, it is surely possible to prevent alignment failure from deteriorating near the step plane.

Next, in the LCD, it is preferable that the angle $\delta$ between the electrode line-shaped portions and the lateral direction of the sub-pixel is in the range expressed by $5°\leq\delta\leq20°$, the angle $\in$ between the extending direction of the electrode line-shaped portions and the extending direction of the step plane is in the range expressed by $5°\leq\in\leq20°$, and the angle $\alpha$ between the rubbing direction and the extending direction of the step plane is 0°. In the LCD, the relationship between the electric field directions, the step plane, the alignment processing direction can satisfy the conditions (1) and (2). Accordingly, since it is possible to regulate the movement of the liquid crystal molecules existing near the step plane by the step plane, it is possible to prevent display contrast from deteriorating attributable to weak aligning force on the step plane.

In the LCD, the angle α between the rubbing direction and the extending direction of the step plane is set to be 0°. By this setting, it is possible to more securely performing alignment processing with respect to the aligning film on the step plane than that case in which the rubbing processing is performed in a direction at an angle to the extending direction of the step plane. As a result, since it is possible to increase aligning force on the step plane, it is possible to prevent alignment failure near the step plane from deteriorating attributable to the step plane.

In the LCD, the second electrode includes two domains in which the electrode line-shaped portions extend at an angle in different directions. Each of the electrode line-shaped portions inclines at an angle in clockwise direction to the lateral direction of the sub-pixel in a plan view viewed from the liquid crystal layer side in either one domain of the two domains and inclines at an angle in counter-clockwise direction to the lateral direction of the sub-pixel in a plan view viewed from the liquid crystal layer side in the other domain of the two domains. It is preferable that the angle δ between the electrode line-shaped portions and the lateral direction of the sub-pixel is in the range expressed by $5° \leq \delta \leq 20°$, the angle ∈ between the extending direction of the electrode line-shaped portions and the extending direction of the step plane is in the range expressed by $5° \leq \in \leq 20°$, and the angle α between the rubbing direction and the extending direction of the step plane is set to be 0°.

In the structure in which the second electrode has two domains in which extending directions of the electrode line-shaped portions of the second electrode are different from each other, it is possible to set the aligning directions of the liquid crystal molecules in the sub-pixel (i.e. directions in which the liquid crystal molecules move when an electric field is applied to the liquid crystal layer) to be different. That is, it is possible to set directors of the liquid crystal molecules to be in two different directions. By setting the alignment directions to be different, orientation angle dependence on viewing angle characteristics in two domains in the sub-pixel is offset, and thus it is possible to improve the viewing angle characteristics.

In the structure having two domains in which extending directions of electrode line-shaped portions in the two domains in each of the sub-pixel are different, by setting the relationship between the electric field direction, the step plane, and the alignment processing direction so as to satisfy the above-mentioned conditions (1) and (2), it is possible to regulate the movement of the liquid crystal molecules existing near the step plane by the step plane. Accordingly, it is possible to prevent display contrast from deteriorating attributable to weak aligning force on the step plane.

In the LCD, it is preferable that a plurality of sub-pixels having colored films colored in different colors is sequentially arranged in the lateral direction of the sub-pixel and forms a single pixel, the layer thickness adjusting film is formed for each of every pixel, the angle δ between the electrode line-shaped portions and the lateral direction of the sub-pixel is 0°, the angle ∈ between the extending direction of the electrode line-shaped portions and the extending direction of the step plane is 0°, and the step plane extends in a straight line form in the single pixel.

By the above-mentioned structure, the relationship between the electric field direction, the step plane, and the rubbing direction can satisfy the above-mentioned conditions (1) and (2). Accordingly, since it is possible to regulate the movement of the liquid crystal molecules existing near the step plane by the step plane, it is possible to prevent display contrast from deteriorating attributable to weak aligning force on the step plane.

In the LCD, the layer thickness adjusting film is formed in the same form as the shape of a single pixel comprised of a plurality of sub-pixels. In the case in which the step planes are formed so as to correspond to the sub-pixels, respectively and extend in a direction inclined to the lateral direction of the sub-pixel, it is possible to form a step at a boundary of adjacent two sub-pixels in a manner such that the short edge of the layer thickness adjusting film protrudes from the edge of the sub-pixel in the longitudinal direction in a plan view. If the step is formed at the boundary of the adjacent sub-pixels, there is probability that alignment failure occurs at the step portion. If the layer thickness adjusting film is formed for each of every pixel and has the same shape as a single pixel, the step portions are formed so as to correspond to sub-pixels of different colors. In comparison with the case in which the step portions are formed so as to correspond to sub-pixels, respectively, it is possible to suppress occurrence of alignment failure.

In the LCD, it is preferable that the first electrode is a plane-shaped electrode having a portion at which the first electrode overlaps the electrode line-shaped portions of the second electrode. The LCD having the above-mentioned structure is an LCD of which an operation mode is FFS mode. If the invention is applied to the LCD operating in FFS mode, it is possible to securely regulate the movement of the liquid crystal molecules existing near the step plane by the step plane. Accordingly, it is possible to surely prevent display contrast from deteriorating attributable to weak aligning force on the step plane.

In the LCD, it is preferable that the layer thickness adjusting film is disposed in a band form over a plurality of sub-pixels. With this structure, it is possible to simplify the pattern of the layer thickness adjusting film in comparison with the case in which the pattern of the layer thickness adjusting film is formed so as to correspond to the sub-pixels. Accordingly, it is possible to suppress manufacturing cost to a small amount. Since the step planes are provided to vicinities between adjacent sub-pixels, it is possible to regulate the movement of the liquid crystal molecules in the vicinities between the sub-pixels. As a result, it is possible to prevent display contrast from deteriorating in the vicinities between the sub-pixels.

In the LCD, it is preferable that the layer thickness adjusting film includes a phase shifting film and a retardation value And of the phase shifting film is a half wavelength. In the LCD, the layer thickness adjusting film is formed on the second substrate so as to correspond to the reflective display region. The layer thickness adjusting film is used in order to realize optimum retardations for the reflective display region and the transmissive display region.

An LCD according to a second embodiment includes a first substrate and a second substrate facing each other, a liquid crystal layer disposed between the first substrate and the second substrate, an aligning film disposed on a liquid crystal layer side surface of the second substrate, the liquid crystal layer on which rubbing processing is performed, a plurality of sub-pixels arranged in planar regions of the first substrate and the second substrate, and a first electrode and a second electrode disposed on a liquid crystal layer side surface of the first substrate, in which the second electrode includes a plurality of electrode line-shaped portions arranged in parallel to each other and spaced apart from each other by a distance, each sub-pixel includes a reflective display region in which a light reflective film is disposed and a transmissive display region in which the light reflective film is not disposed, a layer thickness adjusting film which allows the liquid crystal layer to have different thicknesses in the reflective display region and the transmissive display region is disposed between the second substrate and the aligning film, and the layer thickness adjusting film has a step portion having a step plane extending in a layer thickness direction of the layer thickness adjusting film near a boundary between the reflective display region and the transmissive display region. In the LCD, when an angle between the rubbing direction and the extending direction of the step plane is defined as α, the angle α is in the ranged expressed by $0° \leq \alpha \leq 20°$. The step plane is located at a position where ends of the liquid crystal molecules, which move when a voltage is applied across the first electrode and the second electrode and which are disposed at a leading side of the rubbing direction, come into contact with the liquid crystal molecules in the transmissive display region.

The LCD according to the first aspect of the invention is made in view of the rubbing direction. On the other hand, the LCD according to the second aspect of the invention is made in view of a position of the step plane of the layer thickness adjusting film.

In the LCD according to the second aspect, since the ends of the liquid crystal molecules, which move when a voltage is applied across the first electrode and the second electrode and which are disposed at the leading side of the rubbing direction, come into contact with the liquid crystal molecules in the transmissive display region, it is possible to regulate the movement of the liquid crystal molecules existing near the step plane by the step plane. By this structure, it is possible to suppress the movement of the liquid crystal molecules to a small amount when an electric field is generated between the shared electrode and the pixel electrode. As a result, when the operation state of the LCD changes to the state in which an electric field is not applied, the liquid crystal molecules near the step plane easily turn to the initial alignment state, and thus it is possible to prevent display contrast from deteriorating attributable to weak aligning force on the step plane.

A third aspect of the invention provides an LCD including a first substrate and a second substrate facing each other, a liquid crystal layer disposed between the first substrate and the second substrate, an aligning film which is disposed on a liquid crystal layer side surface of the second substrate and on which rubbing processing is performed, a plurality of sub-pixels arranged in planar regions of the first substrate and the second substrate, and a first electrode and a second electrode disposed on a liquid crystal layer side surface of the first substrate in order to generate an electric field therebetween, in which the second electrode has a plurality of electrode line-shaped portions arranged in parallel to each other and spaced apart from each other, each sub-pixel includes a reflective display region in which a light reflective film is disposed and a transmissive display region in which the light reflective display region is not disposed, a layer thickness adjusting film is disposed between the layer thickness adjusting film and the second substrate in order to make the liquid crystal layer have different thicknesses in the reflective display region and the transmissive display region, and the layer thickness adjusting film provides a step plane extending in a layer thickness direction of the layer thickness adjusting film at a boundary between the reflective display region and the transmissive display region. In the LCD, liquid crystal molecules in the liquid crystal layer is in the initial alignment state in which the liquid crystal molecules are pre-tilted at a predetermined angle to a surface of the aligning film and the step plane is disposed near ends of the pre-tilted liquid crystal molecules, which are separated from the surface of the aligning film when an electric field is generated between the first electrode and the second electrode in the transmissvie display region, of both ends of the liquid crystal molecules.

The LCD of the first aspect of the invention is made in view of the rubbing direction. The LCD of the second aspect of the invention is made in view of the position of the step plane of the layer thickness adjusting film. The LCD of the third aspect of the invention is made in view of the pre-tilt alignment caused to the liquid crystal molecules owing to the rubbing.

In the LCD of the third aspect, since the step plane is disposed in a direction in which the ends of the liquid crystal molecules, which are separated from the surface of the substrate by the pre-tilt alignment, if an alignment direction of the liquid crystal molecules, an extending direction of the step plane, and an extending direction of the electrode line-shaped portions are set in the above-mentioned manner, it is possible to regulate movement of the liquid crystal molecules existing near the step plane by the step plane. For this reason, it is possible to suppress the movement of the liquid crystal molecules to a small amount when an electric field is generated between the shared electrode and the pixel electrode. As a result, when the operation condition of the LCD changes to the condition in which an electric field is not applied, the liquid crystal molecules near the step plane easily turn to the initial alignment state and it is possible to prevent display contrast from deteriorating attributable to weak aligning force on the step plane.

A fourth aspect of the invention provides an electronic apparatus using the above-mentioned LCD. In the LCD of the invention, by setting the relationship between the aligning direction of the liquid crystal molecules, the extending direction of the step plane of the layer thickness adjusting film, the extending direction of the electrode line-shaped portions of the pixel electrode to be in a predetermined angle range, it is possible to regulate the movement of the liquid crystal molecules near the step plane and to prevent display contrast from deteriorating attributable to weak aligning force on the step plane. Accordingly, it is also possible to prevent display contrast from deteriorating in the electronic apparatus having a structure using the LCD.

BRIEF DESCRIPTION OF THE DRAWINGS

The invention will be described with reference to the accompanying drawings, wherein like numbers reference like elements.

DESCRIPTION OF EXEMPLARY EMBODIMENTS

Liquid Crystal Device of First Embodiment

This embodiment relates to the case in which a liquid crystal device (LCD) according to the invention is a transflective active matrix type LCD, which can perform a color display. Further, according to this embodiment, in the LCD, a polysilicon TFT element having a channel etching type single gate structure is used as a switching element. In the LCD according to this embodiment, an operation mode is a fringe field switching (FFS) mode. Still further, the invention is definitely not limited to this embodiment. In figures associated with the description below, some elements are not shown in a real scale but shown in a properly exaggerated scale by which features of the elements are clearly shown.

Figure 1:
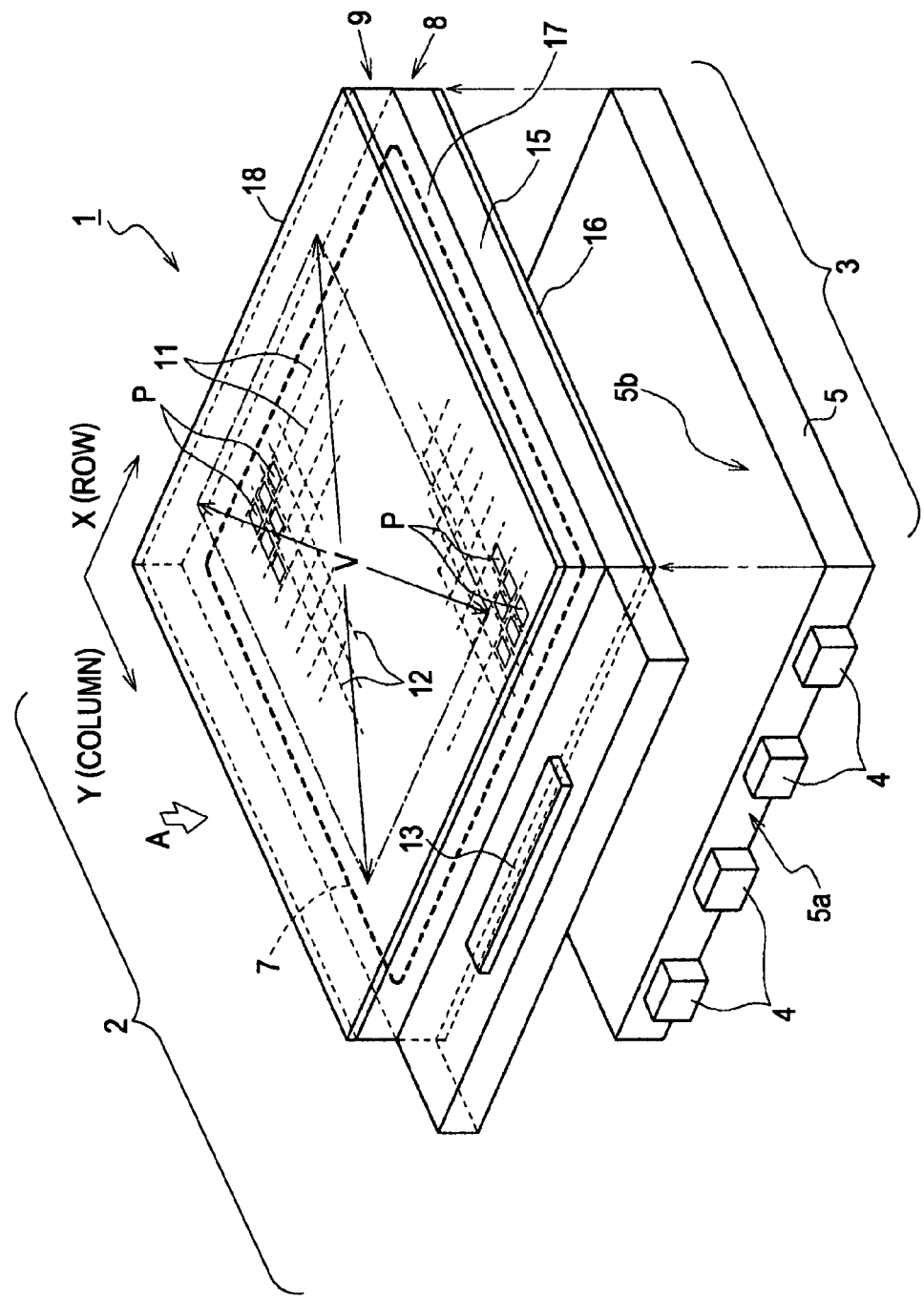
FIG. 1 is a perspective view illustrating a liquid crystal device (LCD) according to a first embodiment.

FIG. 1 shows a liquid crystal device (LCD) 1 according to a first embodiment. In FIG. 1, the LCD 1 includes a liquid crystal panel 2 and a lighting device 3. In the LCD 1 shown in FIG. 1, a side indicated by an arrow A is a viewer side. The lighting device 3 is disposed on the opposite side of the viewer side in the liquid crystal panel 2 and serves as a backlight. The lighting device 3 includes a light emitting diode (LED) 4 serving as a light source and a light guide body 5 made of translucent resin. Light emitted from the LED 4 is introduced into the light guide body 5 through a light incidence surface 5a of the light guide body 5 and is supplied to the liquid crystal panel 2 in a plane form, passing through a light exit surface 5b. The lighting device 3 may not use a point light source such as the LED 4 but use a linear light source such as a cold-cathode tube.

The liquid crystal panel 2 includes substrates 8 and 9 attached to each other by a sealing member 7 having a rectangular or square closed-loop shape (or a frame shape) in a plan view viewed in a direction of an arrow A. The substrate 8 is an element substrate on which switching elements are formed. The substrate 9 is a color filter substrate on which color filters are formed. According to this embodiment, the color filter substrate 9 is arranged on the viewer side, and the element substrate 8 is arranged on the opposite side of the viewer side, i.e. on the rear side. The sealing member 7 is made of resin, for example epoxy-based resin which is heat-curable or ultraviolet ray (UV)-curable. The sealing member 7 is formed a desired closed-loop form by a screen printing method.

In a region in the liquid crystal panel 2, which is surrounded by the sealing member 7, a plurality of scan lines 11 parallel to each other is disposed extending in a row direction X and a plurality of signal lines 12 parallel to each other is disposed extending in a column direction Y. A plurality of dots (islands), each surrounded by the plurality of scan lines 11 and the plurality of signal lines 12, is arranged in rows and columns (i.e. in a matrix form) in a plan view viewed in the direction of the arrow A. Each dot or island includes a sub-pixel P therein. A display region V is formed by arranging the sub-pixels P in a matrix form. In FIG. 1, the sub-pixel P is schematically shown in an enlarged manner. An image is displayed on the outermost surface of the liquid crystal panel 2. The display region V is provided in a plane on the outermost surface of the liquid crystal panel 2. The row direction X and the column direction Y are a lateral direction and a longitudinal direction, respectively in a plane viewed by a viewer when the viewer sees an image display on the liquid crystal panel 2.

The sub-pixel P is a region serving as the unit of display which performs a bright display (white display) and a dark display (black display). A plurality of sub-pixels P is grouped so as to form a single pixel, the unit of display, as a whole. For example, three sub-pixels P correspond to red (R), green (G), blue (B) colors, respectively and the three sub-pixels P act as a single pixel as a whole. Alternatively, four sub-pixels P including the three sub-pixels corresponding to R, G, and B colors and a further color (for example, blue green color) can act as a single pixel as a whole. In this embodiment, three sub-pixels of R, G, and B colors form one pixel.

The element substrate 8 has a protruding portion which protrudes outwardly from the edge of the color filter substrate 9. A driver IC 13 is mounted on the protruding portion by a chip-on-glass (COG) technique using an anisotropic conductive film (ACF). The driver IC 13 receives a control signal from an external control circuit, supplies scan signals to the scan lines 11, and supplies data signals to the signal lines 12. The driver IC 13 can be connected to the liquid crystal panel 2 via a flexible printed circuit (FPC) board as well as it can be connected to the liquid crystal panel 2 by the COG technique.

Figure 2:
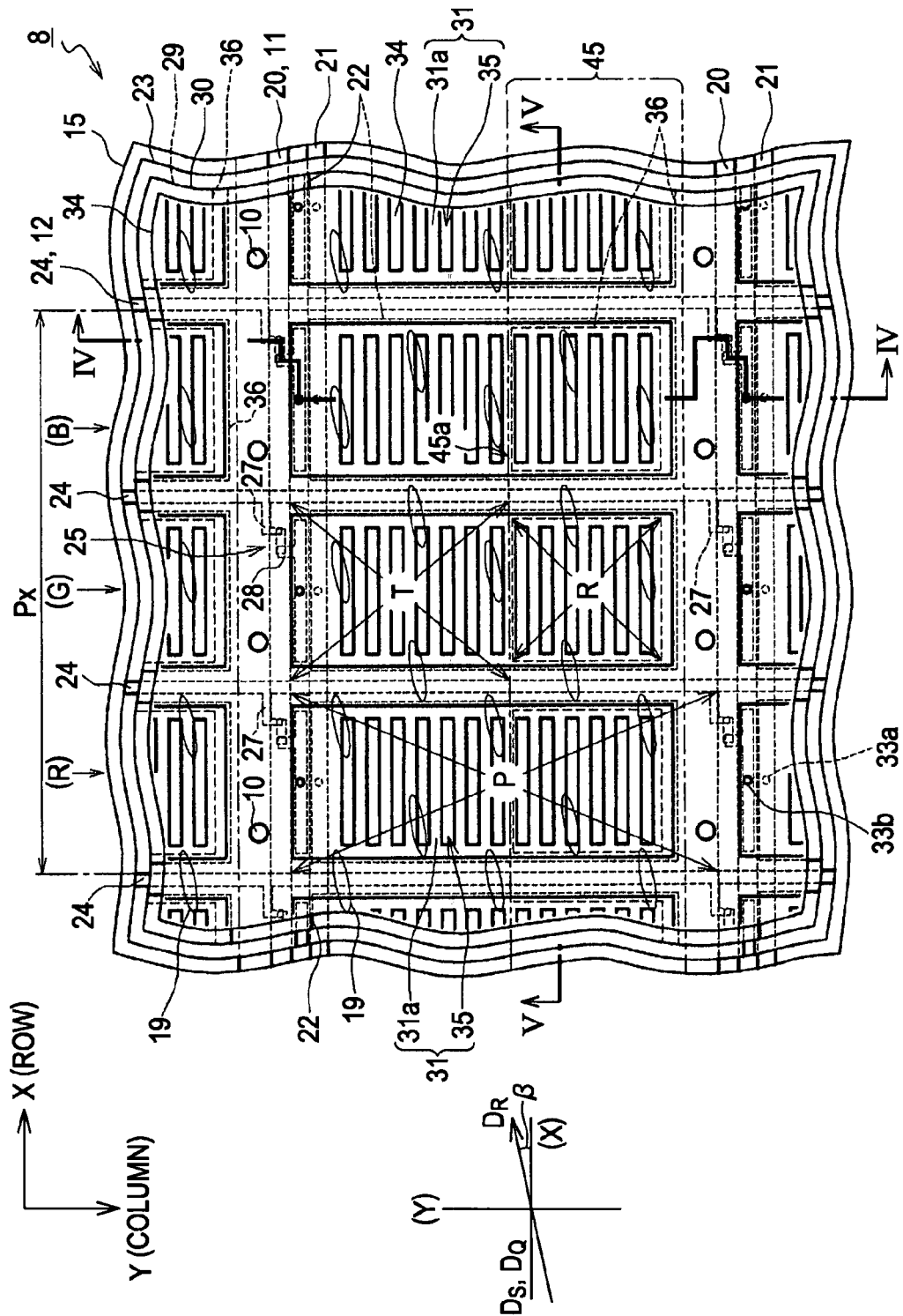
FIG. 2 is a plan view illustrating a region around one pixel on one substrate, which is an element of the LCD shown in FIG. 1.
Figure 3:
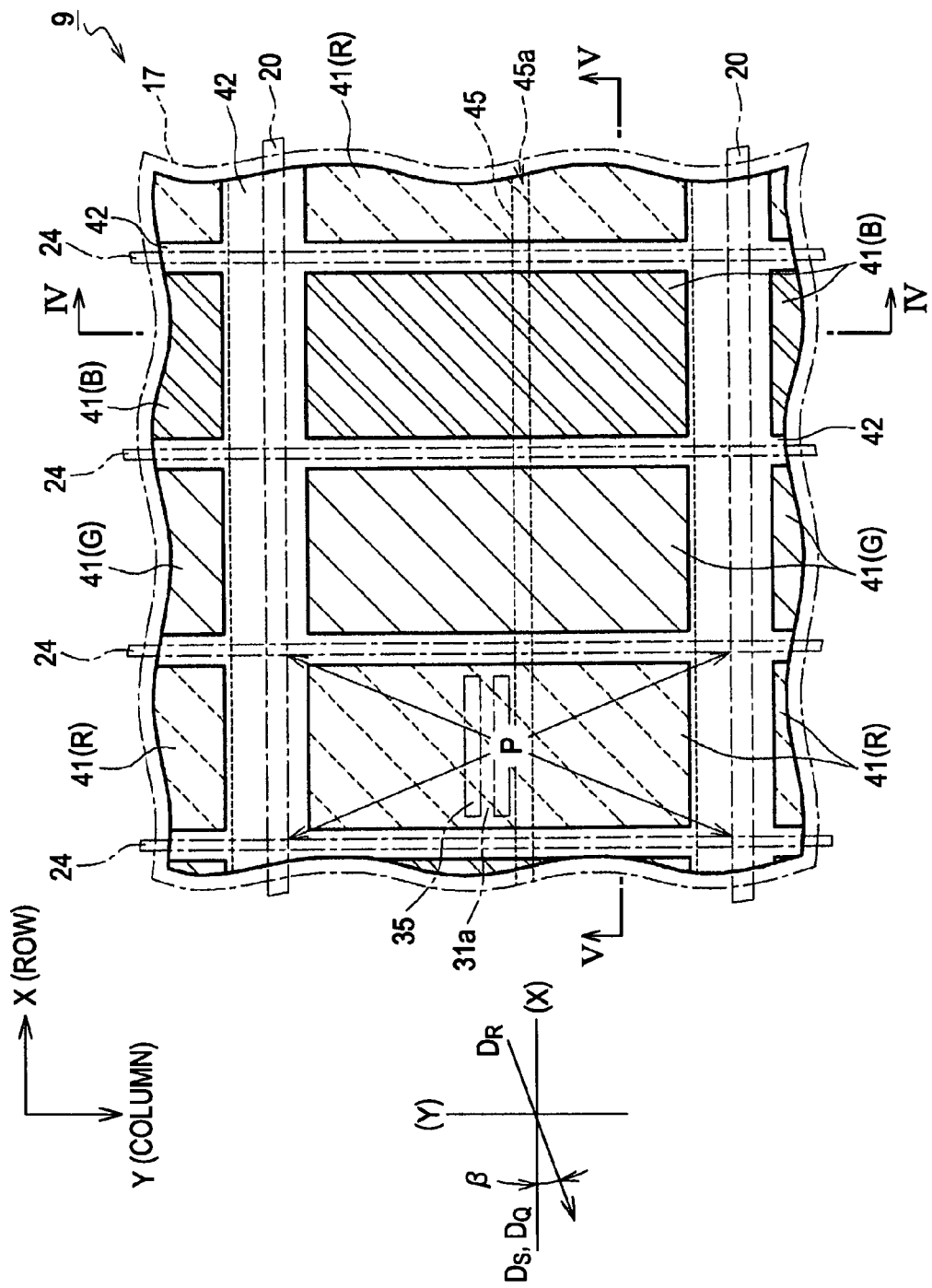
FIG. 3 is a plan view illustrating a region around one pixel on the other substrate, which is an element of the LCD shown in FIG. 1.
Figure 4:
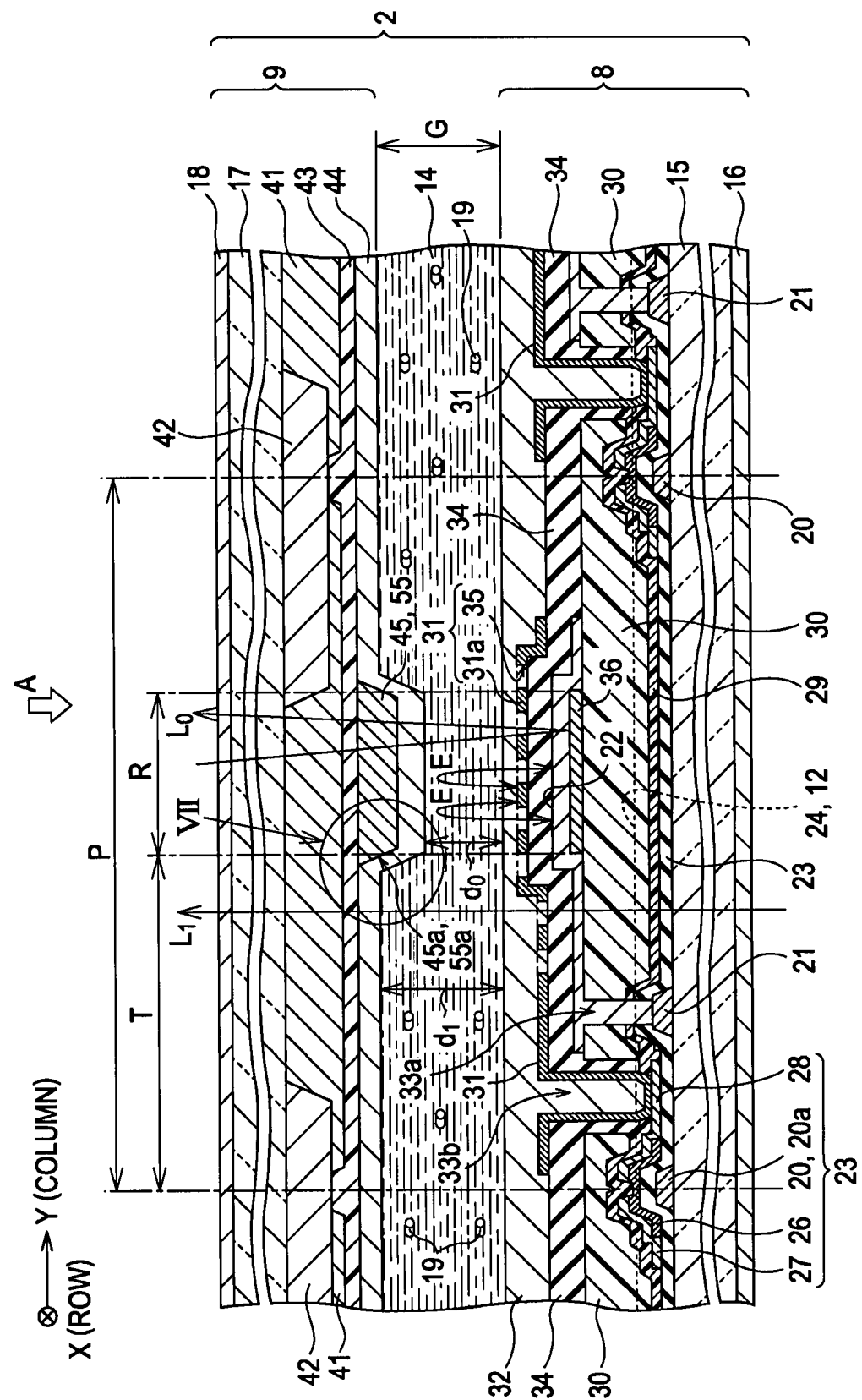
FIG. 4 is a sectional view taken along line IV-IV, i.e. a column direction of a sub-pixel, shown in FIGS. 2 and 3.
Figure 5:
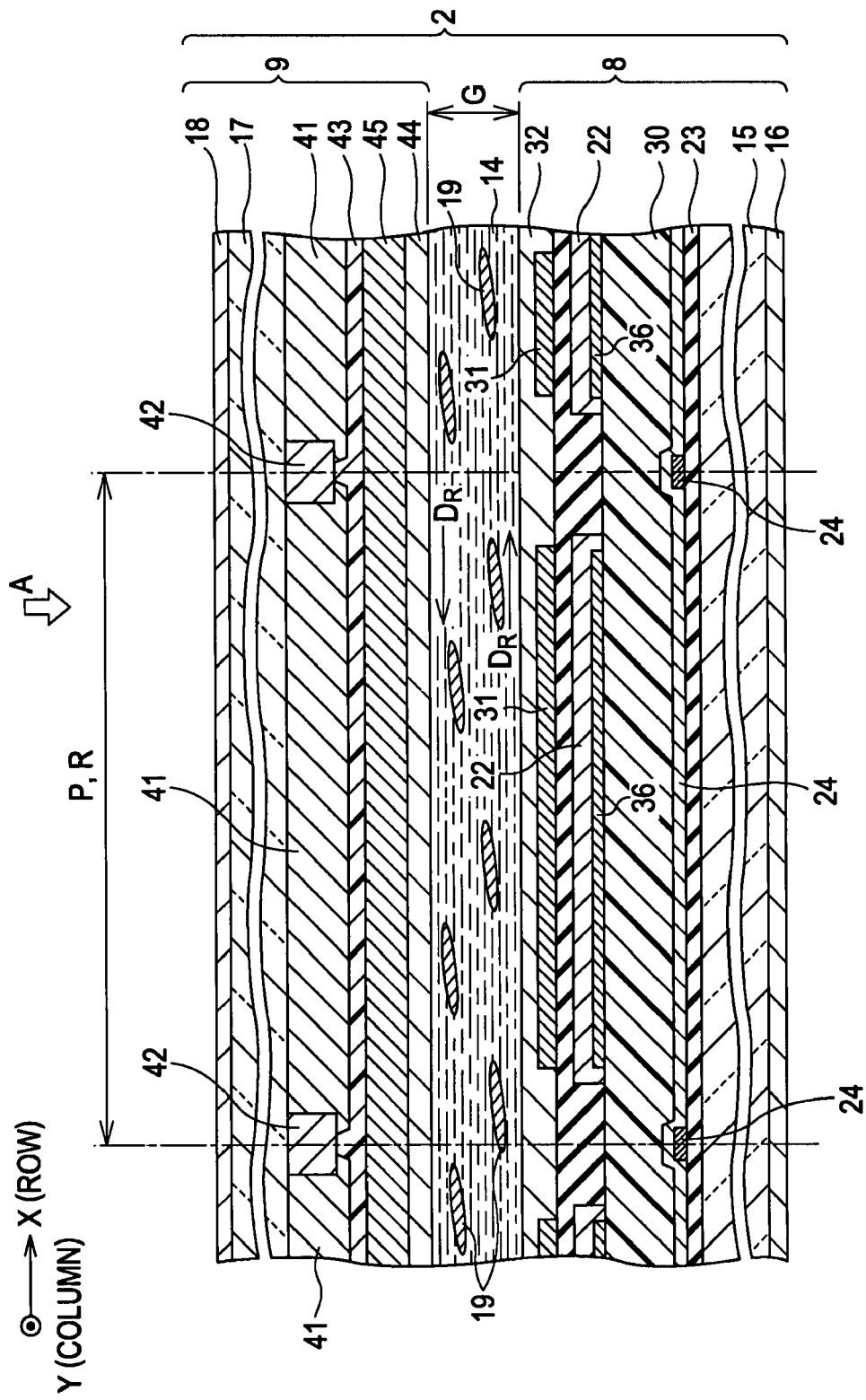
FIG. 5 is a sectional view taken along line V-V, i.e. a row direction of a sub-pixel, shown in FIGS. 2 and 3.

FIG. 2 shows a plane structure of a region around one pixel on the element substrate 8 shown in FIG. 1, in which the plane structure is viewed in a normal line direction of a liquid crystal layer side surface of the element substrate. FIG. 3 shows a plane structure of a region around one pixel on the color filter substrate 9, which is viewed in a normal line direction of a viewer side surface (the opposite surface of the liquid crystal layer side surface) of the substrate. FIG. 3 also shows the color filter substrate 9 viewed in the same direction as in FIG. 2. FIG. 4 shows a sectional structure of one sub-pixel which is taken along line IV-IV, i.e. the column direction Y, shown in FIG. 2. FIG. 5 shows a sectional structure of one sub-pixel which is taken along line V-V, i.e. the row direction X, shown in FIG. 2.

In FIG. 1, a gap having a predetermined thickness, i.e. cell gap, is provided between the element substrate 8 and the color filter substrate 9. The thickness of the cell gap is maintained by a gap member contained in the sealing member 7 and a spacer 10 (shown in FIG. 2) installed on the surface of the element substrate 8 or the color filter substrate 9. In this embodiment, the spacer 10 is provided on the substrate 8 or 9 in a pillar form by a photolithography process. Alternatively, the spacer 10 may be formed by scattering spherical members on the substrate 8 or 9. The cell gap formed by the above-described method is indicated by a reference character G in FIG. 4. Liquid crystals are injected into the cell gap G so as to form a liquid crystal layer 14.

In this embodiment, the liquid crystals are nematic liquid crystals (also called positive liquid crystals) having a positive dielectric anisotropy (Δ∈>0). Reference numeral 19 denotes liquid crystal molecules contained in the liquid crystal. In this embodiment, initial alignment of the liquid crystal molecules 19 is homogeneous alignment obtained by rubbing processing. That is, the initial alignment of the liquid crystal molecules 19 is parallel alignment in which the liquid crystal molecules 19 are aligned in parallel to the element substrate 8 and the color filter substrate 9. The parallel alignment also means the case in which the liquid crystal molecules 19 are aligned at a predetermined pre-tilt angle to the substrate. The liquid crystal layer is 5 micrometers thick.

The element substrate 8 has a first translucent substrate 15 having a rectangular shape or a square shape in a plan view viewed in the direction of the arrow A as a first substrate. The first translucent substrate 15 is made of, for example, glass, translucent plastic, or the like. A first polarizing plate 16 is attached to the outer surface of the first translucent substrate 15. The color filter substrate 9 has a second translucent substrate 17 having a rectangular shape or a square shape in a plan view viewed in the direction of the arrow A as a second substrate. The second translucent substrate 17 is made of, for example, glass, translucent plastic, or the like. A second polarizing plate 18 is attached to the outer surface of the second translucent substrate 17.

Structure on Element Substrate 8

In FIG. 4, on the inner surface (i.e. the liquid crystal layer side surface) of the first translucent substrate 15 is provided gate lines 20 and shared lines 21. The gate lines 20 are plural numbers and extend in the row direction X in parallel to each other as shown in FIG. 2. The shared lines 21 are plural numbers and extend in the row direction X in parallel to the plurality of gate lines. The gate lines 20 serve as the scan lines 11 shown in FIG. 1.

In FIG. 4, a gate insulation film 23 made of a resin film is formed on the gate lines 20 and the shared lines 21 in a plane form so as to cover the gate lines 20 and the shared lines 21, and source lines 24 are formed on the gate insulation film 23 so as to extend in the column direction Y. The source lines 24 serve as the signal lines 12 shown in FIG. 1. In FIG. 2, rectangular regions surrounded by the gate lines 20 and the source lines 24 are regions acting as sub-pixels P, respectively. In this embodiment, a color display is performed based on red (R), green (G), and blue (B) colors, and the sub-pixels P are units corresponding to the colors. Three sub-pixels P which correspond to three colors, respectively and which are arranged in the row direction in order act as one pixel Px, the unit of display, as a whole. With reference to reference characters R, G, and B, it is known that a sub-pixel P of red color (R), a sub-pixel P of green color (G), and a sub-pixel P of blue color (B) are arranged in the column direction in a row.

Thin film transistor (TFT) elements 25 serving as switching elements are disposed near intersections of the gate lines 20 and the source lines 24. The TFT elements 25 are channel-etched type polysilicon TFTs having a bottom gate structure or a single gate structure. In FIG. 4, each of the TFT elements 25 includes a gate electrode 20a which is a portion of the gate line 20, a gate insulation film 23, a semiconductor film 26 formed using polysilicon, a source electrode 27, and a drain electrode 28. The source electrode 27 and the drain electrode 28 are electrode terminals of the TFT element 25 which is a switching element. The source electrodes 27 are formed branching off the source line 24 as shown in FIG. 2. The TFT element 25 in the LCD according to this embodiment has the bottom gate structure, but may alternatively have the top gate structure.

With reference to FIG. 4, a passivation film (protective film) 29, a plane-shaped resin film, is disposed on the gate insulation film 23 in order to cover the TFT elements 25 and the source lines 24. On the passivation film 29 is provided an over-layer 30 and on the over-layer 30 is provided a light reflective film 36. On the light reflective film 36, the shared electrodes 22 serving as the first electrode are disposed. Through holes 33a are formed on the shared lines 21 while penetrating through the gate insulation film 23, the passivation film 29 and the over-layer 30. The shared electrodes 22 and the corresponding shared line 21 are electrically connected via the through holes 33a.

The surface of the light reflective film 36 may have the concave-convex pattern in order to diffuse light under circumstances. The concave-convex pattern is formed by performing a photolithography process with respect to the surface of the over-layer 30 and then forming the light reflective film 36 on the surface of the over-layer 30 which has the concave-convex pattern thereon.

The light reflective film 36 is formed at a region R of the sub-pixel P but is not formed at the other region T of the sub-pixel P. As shown in FIG. 2, the region R is part of the sub-pixel P. The region T is part of the sub-pixel other than the region R. In this embodiment, the region R and the region T are arranged in the longitudinal direction of the sub-pixel P. In each sub-pixel P, a region in which the light reflective film 36 is disposed is a reflective display region R and a region in which the light reflective film 36 is not disposed is a transmissive display region T. In FIG. 4, external light $L_0$ introduced from the viewer side (i.e. in the direction of the arrow A) is reflected from the light reflective film 36 in the reflective display region R. On the other hand, light $L_1$ (shown in FIG. 4) emitted from the lighting device 3 passes through the transmissive display region T.

A capacitor dielectric film 34 is disposed on the shared electrodes 22, and pixel electrodes 31 serving as the second electrode are disposed on the capacitor dielectric film 34. The capacitor dielectric film 34 is an insulation film interposed between the shared electrodes 22 and the pixel electrodes 31. An aligning film 32 is disposed on the pixel electrodes 31 and the capacitor dielectric film 34 over the entire surface of the element substrate 8. The surface of the aligning film 32 undergoes alignment processing, for example, rubbing processing. In FIG. 2, the aligning film 32 is not shown. In FIG. 4, through holes 33b penetrating through the passivation film 29, the over-layer 30, and the capacitor dielectric film 34 are formed on the drain electrodes 28 of the TFT elements 25 and thus the pixel electrodes 31 and the drain electrodes 28 are electrically connected to each other via the through holes 33b.

According to this embodiment, in FIG. 2, the source line 24 is the signal line, and the source electrode 27 of the TFT element 25 extends from the signal line, and the drain electrode 28 of the TFT element 25 is connected to the pixel electrode 31. Instead of the above structure, the electrode in connection with the signal line 24 may be the drain electrode 28 and the electrode in connection with the pixel electrode 31 may be the source electrode 29.

In FIG. 4, the shared electrodes 22 and the pixel electrodes 31 are made of translucent metal oxide such as indium tin oxide (ITO). The gate insulation film 23, the passivation film 29, the over-layer, 30 and the capacitor dielectric film 34 are made of acryl-based resin, silicon nitride (SiN), or silicon oxide (SiO$_2$). The aligning film 32 is made of polyimide. The light reflective film 36 is made of a light reflective metal, for example aluminum (Al) or a metal containing aluminum (Al) as a main component, such as aluminum alloy, and is disposed on part of the sub-pixel P. The light reflective film 36 is formed by depositing a film by a sputtering process and patterning the film by a photolithography process. In this embodiment, as shown in FIG. 2, the light reflective film 36 is scattered in an island form in a plane and is disposed under the sub-pixels P while extending in the longitudinal direction (column direction Y) of the sub-pixel P.

The pixel electrode 31 has a rectangular plane shape and is formed so as to correspond to the sub-pixel P. The pixel electrode 31 has a plurality of slits, i.e. gaps 35, therein. The gaps 35 are openings having a channel shape and penetrating the pixel electrode 31. The capacitor dielectric film 34 which is an under layer of the pixel electrode 31 is visible through the gaps 35. The plurality of gaps 35 extend in a direction parallel to the lateral direction (row direction X) of the sub-pixel P and are arranged apart from each other along the longitudinal direction (column direction Y). In each gap 35, electrode line-shaped portions 31a each having a band shape are formed. The gaps 35 and the electrode line shaped portions 31a are schematically depicted in figures and the real numbers thereof may be different from the numbers depicted in the figures.

According to this embodiment, both ends, in the lateral direction, of the gap 35 are closed but either one end of the both ends may be open. In the case of the open condition, each of the plurality of electrode line-shaped portions 31a has the cantilever structure and the plurality of electrode line-shaped portions 31a has the pectinated structure as a whole. Further, both ends of the gap 35 may be open. In the above-mentioned embodiment, in the sub-pixel P, both electrodes of a pair of electrodes, the shared electrode 22 and the pixel electrode 31, are disposed on the element substrate 8 which is one of the substrates, and a predetermined voltage is applied across both the electrodes. With this structure, an electric field almost parallel to the surface of the element substrate 8, called lateral electric field, is generated and alignment of the liquid crystal molecules 19 in the liquid crystal layer 14 is controlled in a plane almost parallel to the substrate 8 by the lateral electric field.

Figure 6A:
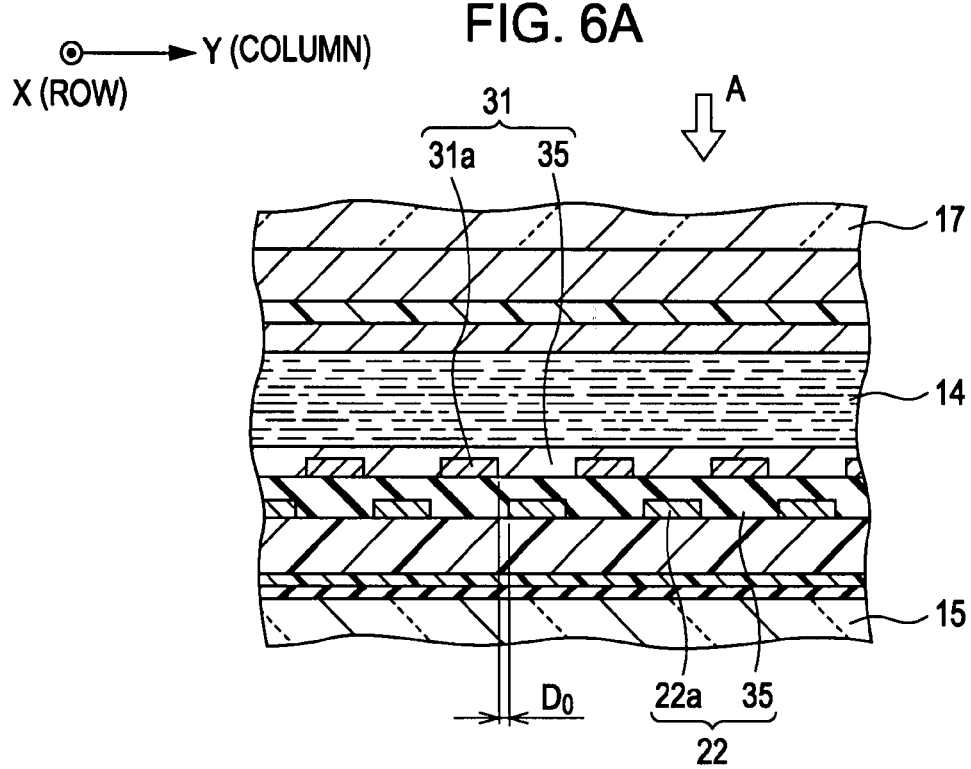
FIGS. 6A and 6B are sectional views illustrating modifications of an electrode structure of an LCD according to the invention, in which FIG. 6A relates to a case in which a gap distance D0 between electrodes is not zero (0) and FIG. 6B relates to a case in which the gap distance D0 between electrodes is zero (0).
Figure 6B:
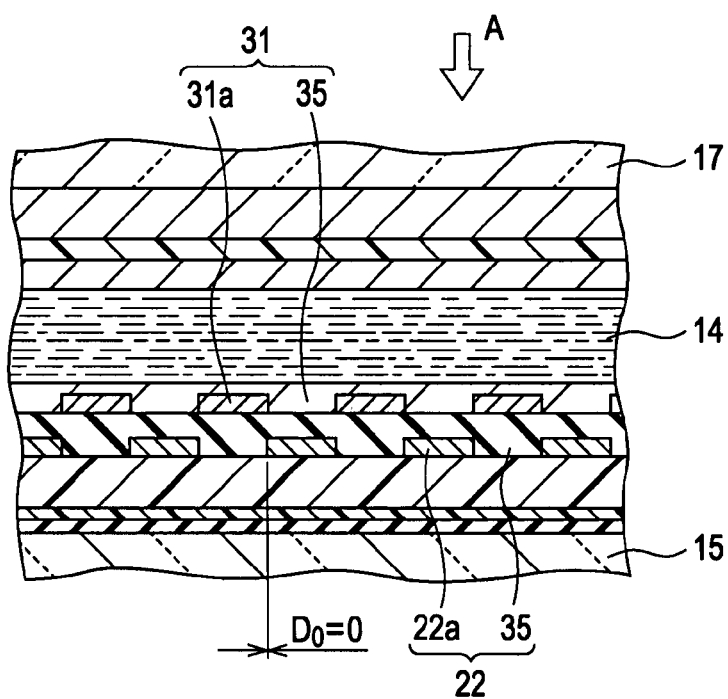

FIG. 6A and FIG. 6B show modifications of an electrode structure comprised of the pixel electrode 31 and the shared electrode 22 shown in FIG. 4. In the embodiment shown in FIG. 4, the shared electrode 22 has a plane form. However, in FIGS. 6A and 6B, the shared electrode 22 has a stripe form extending in a perpendicular direction to a paper plane (i.e. row direction X) by combination of the electrode line-shaped portions 22a and the gaps 35 like the pixel electrode 31. In the modifications shown in FIGS. 6A and 6B, the electrode line-shaped portions 22a of the shared electrodes 22 are disposed between the electrode line-shaped portions 31a of the pixel electrode 31 in a plan view viewed in the direction of the arrow A. In particular, in FIG. 6A, both electrode line-shaped portions 31a and 22a are laterally spaced apart from each other by a distance $D_0$. In FIG. 6B, the distance $D_0$ between both electrode line-shaped portions 31a and 22a is zero (0). In the case of this embodiment shown in FIG. 4, the shared electrode 22 is in a plane form and overlaps the pixel electrode 31 in a plan view. That is, the electrode distance $D_0$ is zero (0).

Known operation modes of the lateral electric field type LCD are IPS mode and FFS mode. An operation mode of the LCD in this embodiment is the FFS mode. To realize the FFS mode needs to generate a laterally oblique electric field (i.e. parabolic form electric field) between the shared electrode 22 and the pixel electrode 31. In order to generate the laterally oblique electric field, the shared electrode 22 and the pixel electrode 31 are arranged in a manner such that the distance $D_0$ is zero (0) as shown in FIG. 6B. That is, the shared electrode 22 and the pixel electrode 31 abut against each other or overlap each other in a plan view viewed in the direction of the arrow A. In this embodiment, as shown in FIG. 4, the shared electrode 22 is disposed in a plane form (also called beta form) in a region of the sub-pixel P on the substrate 15. For this reason, the shared electrode 22 and the pixel electrode 31 overlap each other in a plan view. That is, the distance $D_0$ is zero (0).

As shown in FIG. 6A, if the electrode distance D0 is set to be larger than zero ($D_0$>0), the IPS mode can be used instead of the FFS mode.

Structure on Color Filter Substrate 9

In FIG. 4, on the inner surface (liquid crystal layer side surface) of the second translucent substrate 17, a colored film 41 serving a color filter is formed. Further, a light blocking film 42 is formed around the colored film 41. The colored film 41 has the pattern consisting of rectangular or square dots (i.e. islands) each corresponding to the sub-pixel P as shown in FIG. 3. The pattern of dots (i.e. islands) is shown when the colored film 41 is viewed in the direction of the arrow A. The islands (or dots) of the colored film 41 are arranged in the row direction X and the column direction Y, i.e. in a matrix form. The light blocking film 42 has a grid pattern surrounding the islands of the colored film 41.

Each island of the pattern of the colored film 41 has an optical characteristic which allows any one color of red (R), green (G), and blue (B) colors to pass therethrough. Each island of the pattern of the colored film 41 extends in a stripe form. Reference characters R, G, and B added to reference numeral 41 mean red, green, and blue colors, respectively. In the stripe form arrangement, the same colored islands R, G, or B extends in the column direction Y, and the different colored islands R, G, and B are arranged in the row direction X in order. This sequence of the different colored islands R, G, and B arranged in order is repeated in the row direction X. The islands of the pattern of the colored film 41 are arranged in an alternative form, for example in a mosaic form or a delta form instead of the stripe form. The optical characteristics of the colored film 41 are not limited to three colors including red (R), green (G), and blue (B), but may correspond to three colors including cyan (C), magenta (M), and yellow (Y). Alternatively, the colored film 41 has four optical characteristics corresponding to four colors. The light blocking film 42 is made of resin, for example black resin containing carbon. The light blocking film 42 can be a resin film formed by overlapping two or three colored films 41 having different colors. The light blocking film 42 can be made of a metal film, such as a chrome (Cr) film.

Colored regions R, C, and B is comprised of a red based color region R, a green based color region C, and a blue based color region B of visible light regions in which wavelengths range from 380 to 780 nanometers in which colors change depending on wavelength of light. For example, the blue based color region B has a peak wavelength in the range from 415 to 500 nanometers, the green based color region G has a peak wavelength in the range from 485 to 535 nanometers, and the red based color region R has a peak wavelength of 600 nanometers or longer. The invention is not limited in the color regions. That is, if necessary, any other wavelength range can be selected.

In FIGS. 4 and 5, an overcoat layer 43 is formed on the colored film 41 and the light blocking film 42, a layer thickness adjusting film 45 is formed on the overcoat layer 43, and an aligning film 44 is formed on the layer thickness adjusting film 45. The overcoat layer 43 is formed in a sheet form (beta form) so as to cover the colored film 41 and the light blocking film 42. The colored film 41 is formed using a mixture of photosensitive resin and pigment or a mixture of photosensitive resin and a dye compound. The overcoat layer 43 is made of acryl-based resin. The overcoat layer 43 serves as a protective film which prevents material of the color filter film from intruding into liquid crystals and as a planarizing film which makes the surface of the color filter planar. The aligning film 44 is made of polyimide and a rubbing processing, i.e. an alignment process, is performed with respect to the surface of the aligning film 44.

The layer thickness adjusting film 45 is formed in a manner such that a film of liquid crystal molecules is formed to a thickness of 2 to 3 micrometers, and the film is patterned by a photolithography process so as to leave part of the film at the reflective display region R. Both ends of the layer thickness adjusting film 45 have step planes 45a. The step planes 45a are formed when the layer thickness adjusting film 45 is patterned by a photolithography method and are inclined planes. The step plane 45a is also called an inclined plane. The step plane 45a extends in a band form in the row direction X (perpendicular to the surface of paper) at an angle of 90° or smaller to the surface of the overcoat layer 43. That is, the step plane 45a is the inclined plane formed in a manner such that a layer thickness of the layer thickness adjusting film 45 continuously varies.

As shown in FIG. 4, the layer thickness adjusting film 45 is disposed on the overcoat layer 43 at a position corresponding to the light reflective film 36 on the element substrate 8. Further, as shown in FIG. 3, the layer thickness adjusting film 45 extends in a band form in the row direction X and continuously extends over a plurality of sub-pixels P. The layer thickness adjusting film 45 has the pattern corresponding to that of the light reflective film 36 on the element substrate 8 and is formed in an island form. A retardation value Δnd of the layer thickness adjusting film 45 is set to be a half wavelength. In FIG. 2, it is shown that the step plane 45a and the edge of the light reflective film 36 are slightly misaligned (or spaced apart from each other by a slight distance), but the step plane 45a and the edge of the light reflective film 36 actually overlap each other.

The layer thickness adjusting film is a film for forming a multi-gap structure in which layer thicknesses of the liquid crystal layer are different in the reflective display region and the transmissive display region in the transflective. In the multi-gap structure, it is possible to set different optimum retardation values for the reflective display region and the transmissive display region by adjusting the layer thickness of the liquid crystal layer in the reflective display region and the transmissive display region using the layer thickness adjusting film.

In greater detail, in FIG. 4, the layer thickness adjusting film 45 is disposed in a region corresponding to the reflective display region R but is not disposed in a region corresponding to the transmissive display region T. With this structure, the layer thickness $d_0$ of the liquid crystal layer 14 in the reflective display region R is smaller than the layer thickness $d_1$ of the liquid crystal layer 14 in the transmissive display region T. By adjusting the layer thickness of the liquid crystal layer 14, it is possible to differently set an optimum retardation value Δnd for the reflective type display in which light $L_0$ passes the liquid crystal layer 14 two times in the reflective display region R from an optimum retardation value Δnd for the transmissive type display in which light $L_1$ passes the liquid crystal layer 14 one time in the transmissive display region T.

Here, "Δn" denotes a refractive index anisotropy and "d" denotes the thickness of the liquid crystal layer.

In the LCD according to this embodiment, the layer thickness adjusting film 45 disposed in the region corresponding to the reflective display region R is formed using a phase shifting film. A retardation value Δnd of the phase shifting film 45 is set to be a half wavelength and a retardation value Δnd of the liquid crystal layer of the reflective display region R is set to be a quarter wavelength. By this setting, it is possible to set the retardation value Δnd of the reflective display region R to be a quarter wavelength of a broadband which is optimum for the reflective type display.

Next, the rubbing processing performed with respect to the aligning film will be described. The rubbing processing is generally performed by rubbing the surface of the aligning film with rubbing cloth (blanket cloth) wound around a cylindrical roller which is rotating. In greater detail, the rubbing processing is performed in a predetermined direction by rotating and moving the roller on which the rubbing cloth is wound in the predetermined direction while the roller is in contact with the surface of the aligning film. The liquid crystal molecules are aligned in the direction of rubbing (hereinafter, referred to as "rubbing direction"). In the following description, a side of the surface of the aligning film, to which the roller approaches, is termed "back side in rubbing direction" and a side of the surface of the aligning film, from which the roller starts to separate, is termed as "leading side of rubbing".

In FIG. 4, the direction of rubbing performed with respect to the aligning film 44 on the color filter substrate 9 and the aligning film 32 on the element substrate 8 is parallel to the row direction X but their directions are reverse to the row direction X (anti-parallel relationship). Transmission axes of the first polarizing plate 16 on the element substrate side (back side) and the second polarizing plate 18 on the color filter substrate side (leading side, viewing side) are at a right angle to each other, the transmission axis of the second polarizing plate 18 on the viewing side is parallel to the rubbing direction of the aligning films 44 and 32, and the transmission axis of the first polarizing plate 16 on the back side is perpendicular to the rubbing direction. The rubbing direction will be described below in more detail.

In the LCD 1 having the above-mentioned structure, in the case in which the LCD 1 in FIG. 1 is in a bright indoor space or a bright outdoor space, the reflective type display using external light such as sun light or indoor light is performed. Conversely, in the case in which the LCD 1 is placed in a dark outdoor space or a dark indoor space, the transmissive type display using light from the lighting device 3 serving as a backlight is performed.

In the case of performing the reflective type display, in FIG. 4, the external light $L_0$ passing through the color filter substrate 9 and intruding into the liquid crystal panel 2 in the direction of the arrow A from the viewer side is introduced into the element substrate 8 after passing out the liquid crystal layer 14, and is then introduced again into the liquid crystal layer 14 after it is reflected from the light reflective film 36 in the reflective display region R. On the other hand, in the case of performing the transmissive type display, an LED 4 of the lighting device 3 shown in FIG. 1 emits light, light from the LED 4 is introduced into a light guide body 5 in a direction from a light incidence surface 5a of the light guide body 5 and the light exits from a light exit surface 5b in a plane form. This exit light denoted by reference characters $L_1$ shown in FIG. 4 is supplied to the liquid crystal layer 14, passing through the region, in which the light reflective film 36 does not exist, in the transmissive display region T.

In FIG. 4, the pixel electrode 31 and the shared electrode 22 in a sheet form are stacked with a capacitor dielectric film 34 in between. Since the shared electrode 22 has a sheet form, a distance (in the column direction Y) between the shared electrode 22 and the electrode line-shaped portion 31a of the pixel electrode 31 is zero over the surface of the substrate. In this condition, if a predetermined voltage is applied across both the electrodes, a laterally inclined electric filed E is created between the electrodes near the gap 35. The laterally inclined electric field E is an electric field advancing at an angle to the thickness direction of the liquid crystal layer 14 and to the lateral direction (column direction Y). That is, the electric field E is in a parabolic form. By the laterally inclined electric field E, alignment of the liquid crystal molecules 19 in the liquid crystal layer 14 is controlled in a lateral plane of the substrate.

As a result, the incidence light $L_0$ and the exit light $L_1$ supplied to the liquid crystal layer 14 are modulated for each sub-pixel depending on alignment of the liquid crystal molecules 19 in the lateral plane. When the modulated light passes through the second polarizing plate 18 of the color filter substrate 9, penetration of the light is controlled for each sub-pixel P due to the polarizing characteristic of the second polarizing plate 18 and images of characters, numerals, and diagrams are displayed on the surface of the color filter substrate 9. In this case, alignment of the liquid crystal molecules is not controlled in a plane in a longitudinal direction (direction perpendicular to the substrate) but controlled in a plane in a lateral direction (direction parallel to the substrate). Accordingly, a viewing angle that a viewer sees the display surface of the liquid crystal panel 2 is at an angle and thus a viewing angle that a viewer sees liquid crystal molecules do not change. For this reason, it is possible to achieve a wide viewing angle with the FFS mode by this embodiment.

Figure 7A:
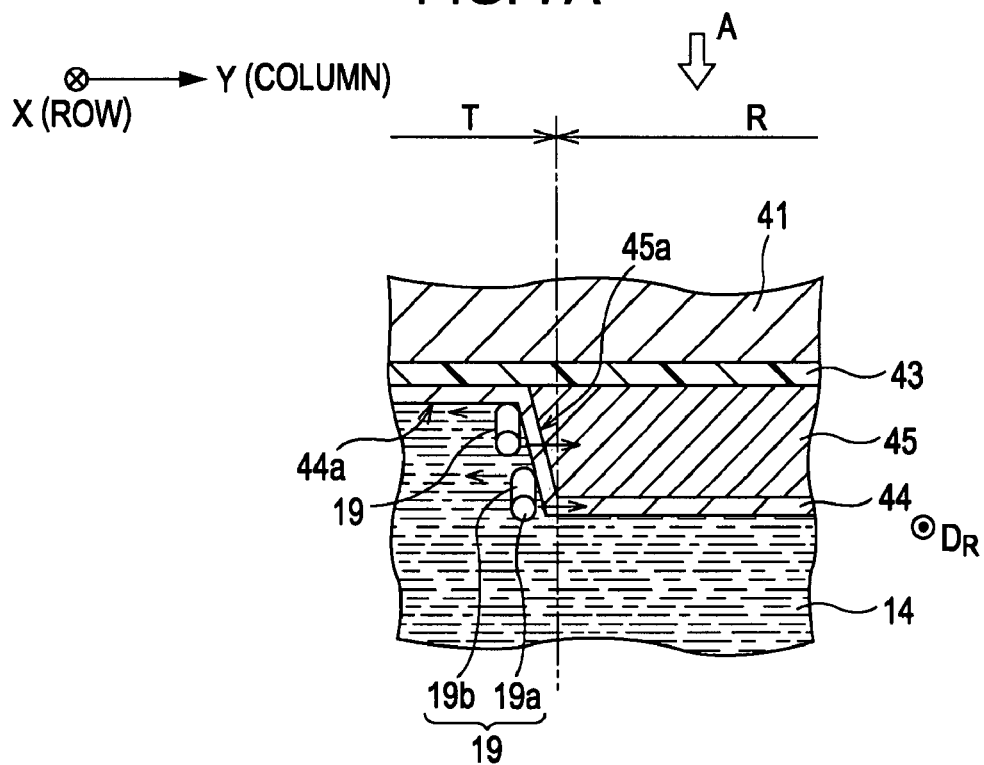
FIG. 7A is a sectional view illustrating a portion of the LCD which is indicated by an arrow ZG in an enlarged manner and 7B is a sectional view in a plane view viewed in a direction of an arrow A.
Figure 7B:
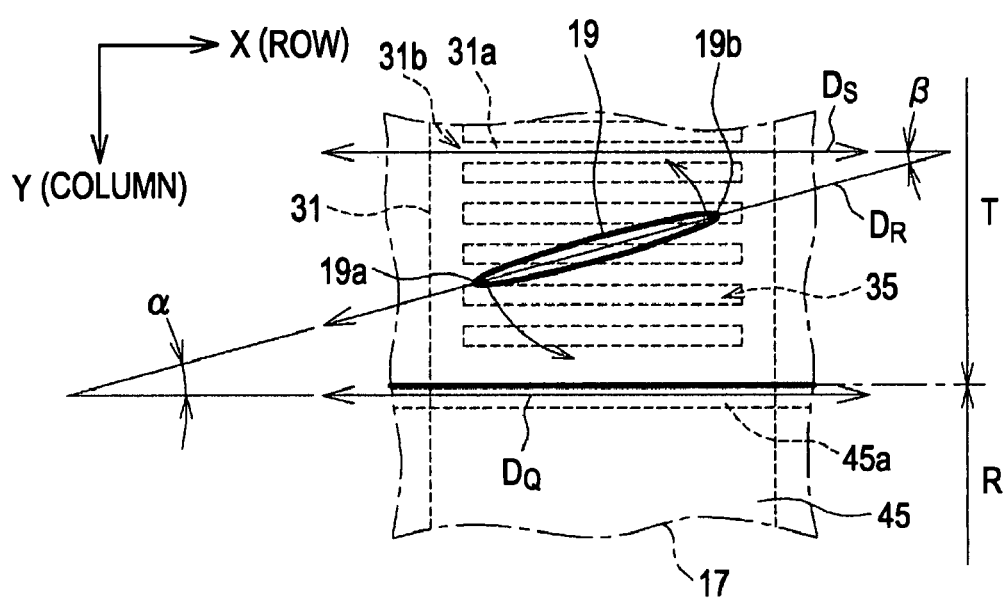

Relationship between rubbing direction, extending direction of electrode line-shaped portion, and extending direction of step plane of layer thickness adjusting film The relative directional relationship among the rubbing direction (alignment processing direction), the extending direction (direction perpendicular to the electric field) of the electrode line-shaped portions, and the extending direction of the step plane of the layer thickness adjusting film is explained with reference to an orientation relational diagram shown on a left side in FIG. 2 and orientation relational diagrams shown on left sides in FIG. 3, FIGS. 7A, and 7B.

In the orientation relational diagram in FIG. 2, $D_R$ denotes the rubbing direction on the element substrate 8, $D_S$ denotes the extending direction of the electrode line-shaped portions 31a, and $D_Q$ denotes the extending direction of the step plane 45a of the layer thickness adjusting film 45 on the color filter substrate 9. In the orientation relational diagram in FIG. 3, $D_R$ denotes the rubbing direction on the color filter substrate 9, $D_S$ denotes the extending direction of the electrode line-shaped portions 31 on the element substrate 8, and $D_Q$ denotes the extending direction of the step plane 45a of the layer thickness adjusting film 45.

FIG. 7A shows a portion of the step plane 45a of the layer thickness adjusting film 45, the portion indicated by an arrow ZG in FIG. 4. That is, FIG. 7A shows a boundary portion between the transmissive display region T and the reflective display region R in an enlarged manner. FIG. 7B is a plan view viewed in a direction of the arrow A shown in FIG. 7A. That is, FIG. 7B is a view showing a region around the step plane 45a in FIG. 2, the view is taken in a normal line direction of the substrate through the color filter substrate 9. FIGS. 7A and 7B show the condition in which an electric field is not generated between the pixel electrode 31 and the shared electrode 22. That is, FIGS. 7A and 7B show the initial alignment state.

First, the rubbing direction and the initial alignment state of the liquid crystal molecules will be explained. As described above, the rubbing, alignment processing, is performed with respect to the aligning films 32 and 44. The liquid crystal molecules 19 are initially aligned in the rubbing direction. In FIG. 2, the liquid crystal molecules 19 are aligned at an angle by a small amount to the lateral direction (row direction X) of the sub-pixel P in a plan view viewed in a normal line direction of the substrate. In a sectional view shown in FIG. 5, the liquid crystal molecules 19 are aligned in a direction almost parallel to the color filter substrate side surface of the aligning film 44 and in a direction having an angle to a normal line direction of the aligning film 44. That is, the liquid crystal molecules are aligned in a pre-tilt state.

The alignment of the liquid crystal molecules 19 shown in FIGS. 2 and 5 depends on the rubbing direction. The rubbing direction has the anti-parallel relationship with the rubbing direction RD on the element substrate side in the orientation relational diagram shown in FIG. 2 and with the rubbing direction RD on the color filter substrate side in the orientation relational diagram shown in FIG. 3. That is, the aligning film 32 on the element substrate 8 undergoes a rubbing processing performed in a direction from the left side to the right side in FIG. 5. The aligning film 44 on the color filter substrate 9 undergoes a rubbing processing performed in a direction from the left side to the right side in FIG. 5. In FIG. 2, the liquid crystal molecules 19 are aligned in a manner such that long-axes (directors of liquid crystals) thereof are aligned in the same direction as the rubbing direction $D_R$ on the element substrate side. Accordingly, the tilt of the liquid crystal molecules 19 in a plan view is the same as the tilt of the rubbing direction $D_R$. On the other hand, in FIG. 5, ends of the liquid crystal molecules 19, which are disposed on the leading side of the rubbing direction $D_R$, are separated from the surface of the aligning films 32 and 44 on both the element substrate side and the color filter substrate side, and ends of the liquid crystal molecules 19, which are disposed on the back side of the rubbing direction $D_R$, are in contact with the surfaces of the aligning films 32 and 44 or are separated by a slight distance. This state is called the pre-tilt state.

Next, in FIG. 4, taking a region near the step plane 45a of the layer thickness adjusting film 45 and a boundary between the reflective display region R and the transmissive display region T into consideration, as shown in FIG. 7A, the ends 19a of the liquid crystal molecules 19 in the pre-tilt state as the initial state, the ends being disposed on the surface side of paper, are separated from the surface 44a of the aligning film 44. On the other hand, ends 19b of the liquid crystal molecules 19, disposed on the inside of paper, are in contact with the surface 44a of the aligning film 44. That is, the rubbing direction of the aligning film 44 is the same as the direction (indicated by the arrow $D_R$) from the right side to the left side in FIG. 7B and also the same as the direction from the inside to the surface side of the paper in FIG. 7A.

The liquid crystal molecules 19 rotate at an angle in a plane parallel to the surface of the second substrate 17 and their state changes from the initial alignment state (the pre-tilt state) to a different alignment state when an electric field E is generated between the pixel electrode 31 and the shared electrode 22 in FIG. 4 by voltage application. By rotation of the liquid crystal molecules 19, a dark display (black display) or a bright display (white display) switch to the other. Amount of the rotational motion of the liquid crystal molecules 19 is larger at a position far from the surface of the aligning film (on the back side of rubbing) than a position near the surface of the aligning film (on the leading side of rubbing).

The step plane 45a (the inclined plane) is a slope portion in which a thickness of the layer thickness adjusting film 45 continuously changes. Aligning force of the liquid crystal molecules is weaker at the step plane 45 than at other regions. For this reason, when the driving state changes from a first state (voltage application state), in which an electric field is applied to the liquid crystal layer 14, to a second state, in which an electric field is not applied, it happens that the liquid crystal molecules 19 refuse to return to the initial alignment state. In this case, alignment failure occurs near the step plane 45a, i.e. at the boundary between the reflective display region R and the transmissive display region T, and thus display contrast deteriorates.

Therefore, in this embodiment, it is possible to prevent alignment failure from occurring by regulating the relationship between the extending direction of the electrode line-shaped portions (direction perpendicular to the electric field), the extending direction of the layer thickness adjusting film, and the aligning direction of the liquid crystal molecules. In greater detail, the following conditions are set.

(1) In FIG. 2, the step plane 45a of the layer thickness adjusting film 45 on the color filter substrate side overlaps the edge of the light reflective film 36 in a plan view viewed in a normal line direction of the substrate.

(2) In FIG. 2, the extending direction of the electrode line-shaped portion 31a of the pixel electrode 31 is parallel to the lateral direction of the sub-pixel P.

(3) In an orientation relational diagram of FIG. 2, the extending direction $D_S$ of the electrode line-shaped portions 31a and the extending direction $D_O$ of the step plane 45a are parallel to each other. In the condition (2), as the extending direction $D_S$ of the electrode line-shaped portion 31a is parallel to the lateral direction of the sub-pixel, the step plane 45a is parallel to the lateral direction of the sub-pixel.

(4) In an orientation relational diagram of FIG. 3, the extending direction $D_O$ of the step plane 45a and the rubbing direction $D_R$ on the color filter substrate 9 has an angle $\alpha$ to each other, and the angle $\alpha$ is 5°.

(5) In the orientation relational diagram of FIG. 3, the rubbing direction $D_R$ is a direction approaching the step plane 45a from a position far from the step plane 45a.

(6) The rubbing direction $D_R$ on the element substrate side in the orientation relational diagram of FIG. 2 and the rubbing direction $D_R$ on the color filter side shown in FIG. 3 are parallel to each other, but their directions are opposite (anti-parallel relationship).

(7) In the orientation relational diagram of FIG. 2, the extending direction $D_S$ of the electrode line-shaped portion 31a and the rubbing direction $D_R$ has an angle $\beta$ to each other and the angle $\beta$ is 5°.

By the above-mentioned condition, "movement in a plane" (hereinafter, termed "in-plane movement") of the liquid crystal molecules 19 existing near the step plane 45a during a voltage application period can be regulated by the step plane 45a. In greater detail, in FIG. 7B, when an electric field is applied to the liquid crystal layer, ends 19a of the liquid crystal molecules 19, which are separated from the substrate by the pre-tilt state (the ends on the leading side of the rubbing direction), moves in rotational locomotion or swing motion at an angle larger than an angle of moving direction of the opposite ends 19b of the liquid crystal molecules 19. However the movement of the ends 19a is stopped because the step plane 45a is present in front of the ends 19a (in moving direction) and thus the ends 19a come into contact with the step plane 45a when they move. Accordingly, the movement of the liquid crystal molecules 19a of which orientations change near the step plane 45a during an electric field application period is limited to a small amount. By this design, when the state in which a voltage is supplied switches to the state in which a voltage is not supplied, the liquid crystal molecules 19 can be easily aligned back in the initial alignment state. As a result, it is possible to prevent alignment failure from occurring near the step plane 45a, i.e. at the boundary between the reflective display region R and the transmissive display region T and prevent display contrast from deteriorating.

In FIG. 3, the inventor of the invention observed display contrast at the boundary between the reflective display region R and the transmissive display region T, changing the angle $\alpha$ between the rubbing direction $D_R$ and the step plane 45a in the range expressed by $0° \leq \alpha \leq 20°$ but except 5° while changing the angle $\beta$ between the electrode line-shaped portion 31a and the rubbing direction $D_R$ in the range expressed by $5° < \beta \leq 20°$ (except 5°). In the case in which the angle $\alpha$ is not 0°, i.e. in the case in which the rubbing direction $D_R$ is not parallel to the step plane 45a, the rubbing is performed in a direction approaching the step plane 45a from an opposing side of the step plane 45a. In the case in which the angle $\alpha$ is 0°, i.e. the rubbing direction $D_R$ is parallel to the step plane 45a, the rubbing is performed in both directions, left-to-right direction and right-to-left direction in FIG. 7B. As the result of the observation, when the angles $\alpha$ and $\beta$ are set in the above-mentioned ranges, it is found that it is possible to achieve high contrast at the boundary of the reflective display region R and the transmissive display region T.

In this embodiment, as shown in FIG. 2, the electrode line-shaped portions 31a and the gaps 35 of the pixel electrode 31 are arranged in a direction parallel to the lateral direction X of the sub-pixel P. That is, an angle $\in$ is 0°. This pixel structure is generally called transverse slit structure. This transverse slit structure not only means a structure in which the extending direction of the electrode line-shaped portions 31a is substantially parallel to the lateral direction X of the sub-pixel P but also means the structure in which the extending direction of the electrode line-shaped portions 31a has a predetermined angle to the lateral direction X of the sub-pixel P in which the predetermined angle is in the range from 0° to 45° in clockwise direction and in the range from 0° to 45° in counter-clockwise direction when viewing the electrode line-shaped portions 31a from the liquid crystal layer side. The inventor observed display contrast at the boundary between the reflective display region R and the transmissive display region T in the transverse slit structure over a wide angle range. As a result, when the extending direction of the electrode line-shaped portions 31 is set to be in the above-mentioned range, it is found that it is possible to achieve high contrast at the boundary between the reflective display region R and the transmissive display region T.

Liquid Crystal Device of Second Embodiment

Figure 8:
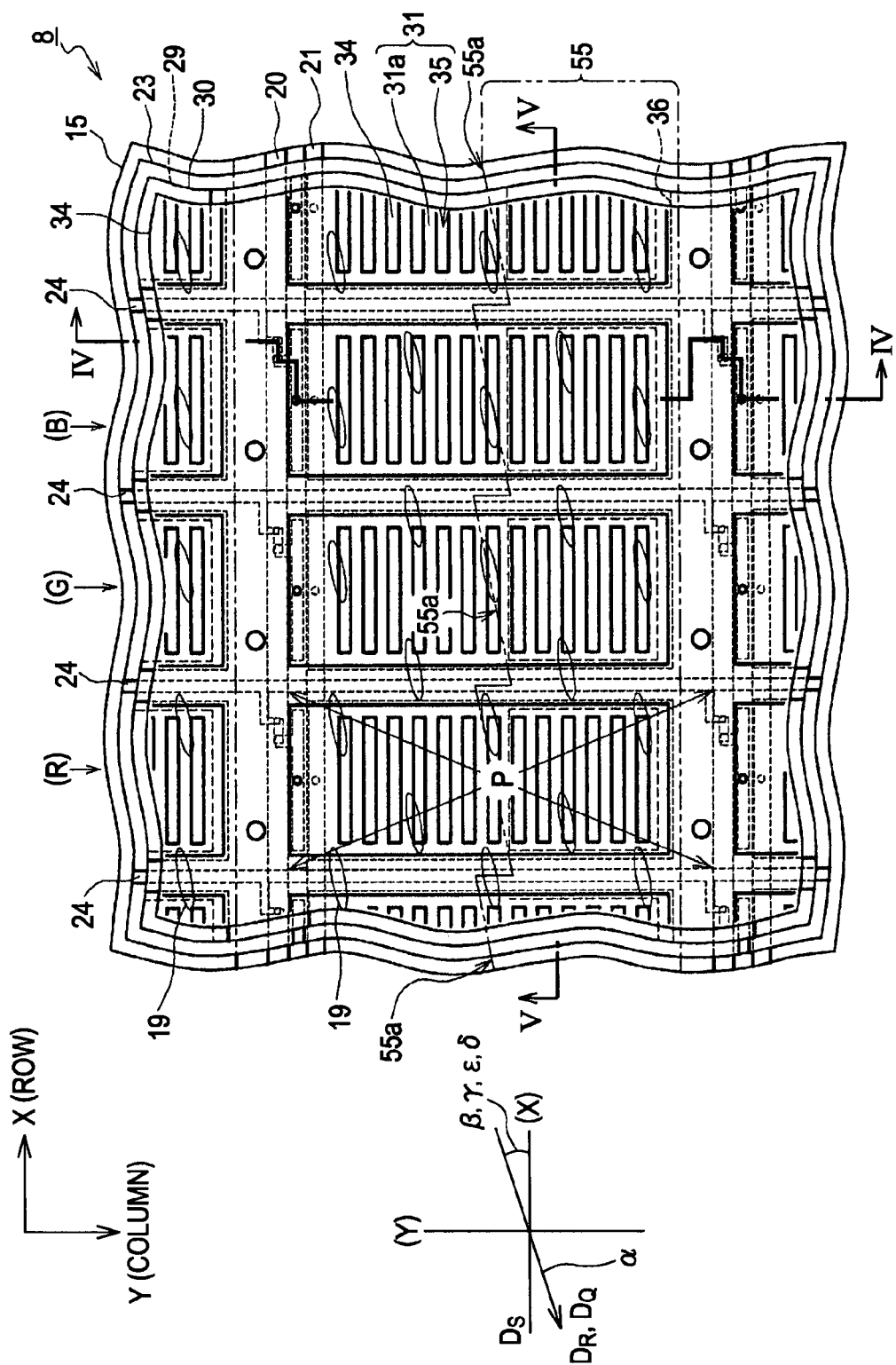
FIG. 8 is a plan view illustrating main part of an LCD according to a second embodiment, and more particularly a region around one pixel on one substrate.

FIG. 8 shows main part of an element substrate 8 of an LCD according to a second embodiment. A color filter substrate is not shown in this figure but a layer thickness adjusting film 55 disposed on the color filter substrate is shown. A rubbing direction $D_R$ in an orientation relational diagram in this figure is a rubbing direction on a color filter substrate side and has the anti-parallel relationship with a rubbing direction on an element substrate side.

The overall structure of the LCD according to the second embodiment is the same as the structure of the LCD according to the first embodiment shown in FIG. 1. In FIG. 8, the sectional structure of a sub-pixel P in column direction Y, taken along line IV-IV is the same as that shown in FIG. 4 according to the first embodiment. In FIG. 8, the sectional structure of a sub-pixel in row direction X, taken along line V-V is the same as the sectional structure shown in FIG. 5 according to the first embodiment.

The second embodiment is different from the first embodiment in the following points. In the first embodiment, as shown in FIG. 3, the extending direction $D_Q$ of the step plane 45a of the layer thickness adjusting film 45 on the color filter substrate 9 is parallel to the lateral direction X of the sub-pixel P. On the other hand, in this embodiment, as shown in FIG. 8, the extending direction $D_Q$ of the step plane 55a of the layer thickness adjusting film 55, which is an inclined plane, has an angle to the lateral direction X of each of the sub-pixel P. Hereinafter, the LCD of this embodiment will be described in greater detail. Like elements in FIG. 2 and FIG. 8 will be denoted by like reference characters and numerals.

As shown in FIG. 4, the layer thickness adjusting film 55 in FIG. 8 is disposed on an overcoat layer 43 of a color filter substrate 9 and disposed so as to face and correspond to the light reflective film 36 on the element substrate 8. The layer thickness adjusting film 55, as shown in FIG. 8, is formed in a band form extending in row direction X and continuously extends over a plurality of sub-pixels P. An end portion of the layer thickness adjusting film 55 corresponding to a boundary portion between a reflective display region R and a transmissive display region T has a step plane 55a thereon.

Figure 12A:
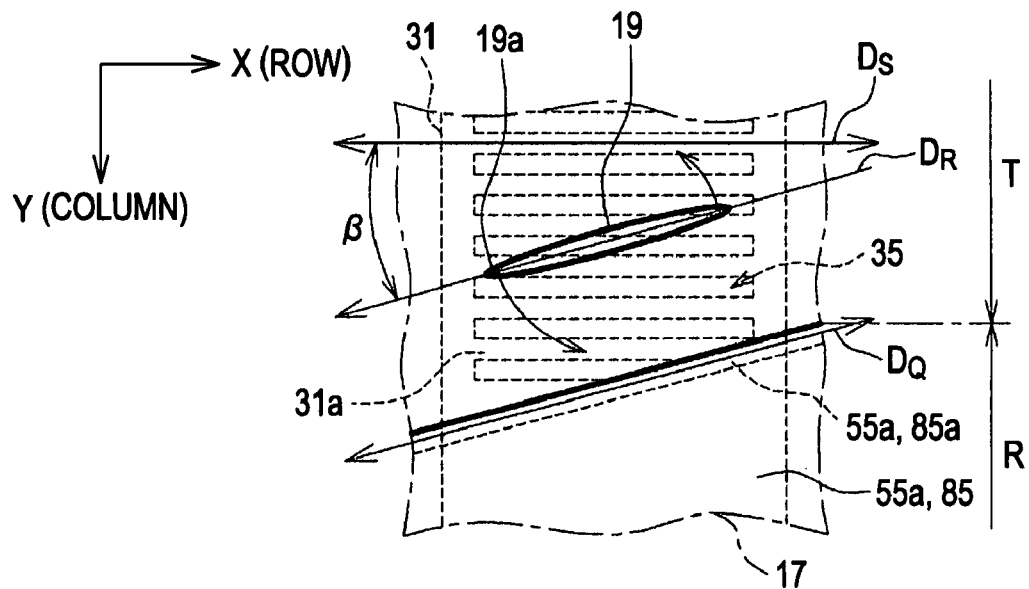
FIG. 12A is a plan view illustrating the substrate shown in FIG. 8 or 11 and a region near a step plane of a substrate opposing the substrate shown in FIG. 8 or 11 and FIG. 12B is a plan view illustrating the substrate shown in FIG. 9 or 10 and a region near a step plane of a substrate opposing the substrate shown in FIG. 9 or 10.

In this embodiment, the following conditions are set and this embodiment adequately refers FIG. 12A. FIG. 12A shows a region around the step plane 55a in FIG. 8, viewed in a normal line direction of the substrate through the color filter substrate 9, in an enlarged manner.

(1) In FIG. 8, an extending direction $D_S$ of the electrode line-shaped portions 31a of the pixel electrode 31 is parallel to the lateral direction X of the sub-pixel P. That is, the extending direction $D_S$ of the electrode line-shaped portions 31a has an angle δ to the lateral direction X of the sub-pixel P and the angle δ is 0°.

(2) In an orientation relational diagram of FIG. 8, the extending direction $D_S$ of the electrode line-shaped portions 31a and the extending direction $D_Q$ of the step plane 55a have an angle ∈ to each other and the angle ∈ is 5°.

(3) In the orientation relational diagram of FIG. 8, the rubbing direction $D_R$ and the extending direction $D_Q$ of the step plane 55a are parallel to each other. That is, an angle α between the rubbing direction $D_R$ and the extending direction $D_Q$ of the step plane 55a is 0°.

(4) The rubbing direction $D_R$ on the color filter substrate side in the orientation relational diagram of FIG. 8 and the rubbing direction (not shown) on the element substrate side are parallel to each other but their directions are opposite (anti-parallel relationship).

(5) In FIG. 12A, the extending direction $D_Q$ of the step plane 55a has an angle to the lateral direction (row direction X) of the sub-pixel P. In particular, the step plane 55a extends slop down to the left. In the orientation relational diagram of FIG. 8, the extending direction $D_Q$ of the step plane 55a has an angle γ to the lateral direction (row direction) of the sub-pixel P. The step plane 55a extends at an angle to each of the sub-pixel P. Accordingly, the step plane 55a has a saw blade shape or a wedge shape when showing it in a plan view.

(6) In FIG. 12A, the rubbing direction $D_R$ and the extending direction $D_S$ of the electrode line-shaped portions 31a have an angle β and the angle β is 5°.

By the above-mentioned condition setting, it is possible to regulate in-plane movement of the liquid crystal molecules 19 existing near the step plane 55a during an electric field application period by the step plane 55a. In greater detail, if an electric field is applied to the liquid crystal layer 14, distal ends 19a of the liquid crystal molecules 19, which are separated from the substrate by the pre-tilt alignment, move in rotational locomotion or in swing motion in a plane. However, since the step plane 55a is disposed in front of the liquid crystal molecules in a moving direction, the movement of the distal ends 19a of the liquid crystal molecules 19 is limited by the step plane 55a. Accordingly, movement of the liquid crystal molecules 19 during the electric field application period is limited to a small amount. With this structure, the liquid crystal molecules 19 easily returns to the initial alignment state when the driving state of the LCD changes from a first state in which a voltage is supplied to a second state in which a voltage is not supplied. As a result, it is possible to prevent alignment failure from occurring near the step plane 55a, i.e. at the boundary between the reflective display region and the transmissive display region and to prevent display contrast from deteriorating.

In this embodiment, referring to the condition (3), the rubbing direction $D_R$ and the extending direction $D_Q$ of the step plane 55a are parallel to each other (α=0°). By the condition, it is possible to more securely perform alignment processing with respect to the aligning film 44 on the step plane 55a than the case in which the rubbing processing is performed in a direction having a predetermined angle to the extending direction $D_Q$ of the step plane 55a. As a result, aligning force in the step plane 55a becomes stronger than that in the case in which the rubbing processing is performed in a direction having a predetermined angle to the step plane 55a, and thus it is possible to surely prevent alignment failure from occurring near the step plane 55a.

In FIG. 8, the layer thickness adjusting film 55 is disposed on the color filter substrate 9 facing the element substrate 8, but the step plane 55a of the layer thickness adjusting film 55 is disposed at a position spaced outwardly away from the edge of the light reflective film 36 disposed on the element substrate 8 in a top plan view viewed in a normal line direction of the substrate. The invention is not limited to this structure but the structure may be a saw blade shape or a wedge shape in which the edge of the light reflective film 36 overlaps the step plane 55a.

Liquid Crystal Device of Third Embodiment

Figure 9:
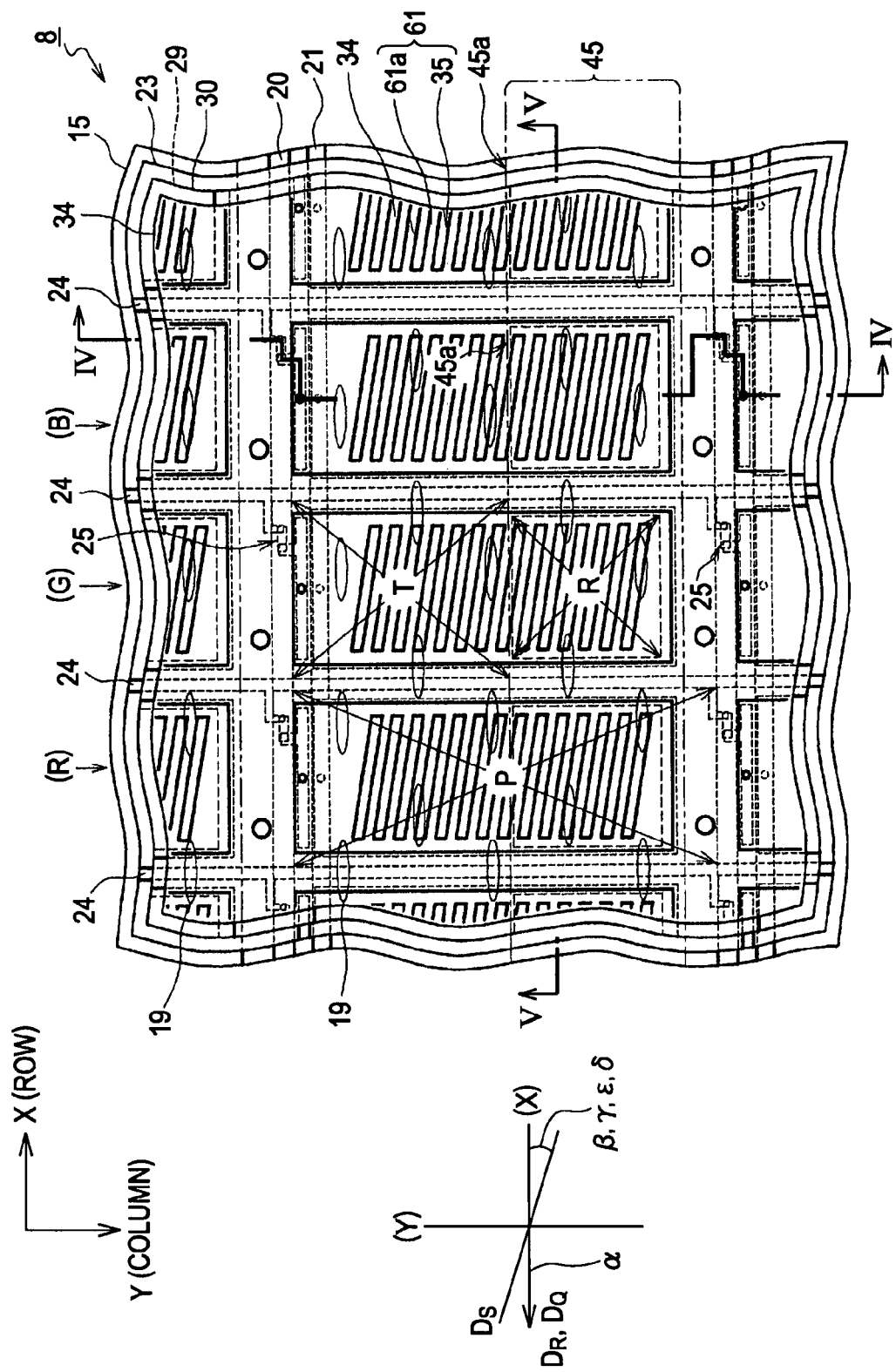
FIG. 9 is a plan view illustrating main part of an LCD according to a third embodiment, and more particularly a region around one pixel on one substrate.

FIG. 9 shows main part of an element substrate 8 of an LCD according to a third embodiment. In this figure, a color filter substrate is not shown but a layer thickness adjusting film 45 disposed on the color filter substrate is shown in a dotted line. A rubbing direction $D_R$ in an orientation relational diagram shown on the left side in FIG. 9 is a rubbing direction on the color filter substrate side for convenience's sake of explanation and has the anti-parallel relationship with a rubbing direction on the element substrate side.

The LCD according to the third embodiment has the overall structure the same as the LCD structure according to the first embodiment shown in FIG. 1. The sectional structure of the sub-pixel P taken along column direction Y and along line IV-IV in FIG. 9 is the same as the sectional structure shown in FIG. 4 according to the first embodiment. The sectional structure of the sub-pixel taken along row direction X thereof and along line V-V in FIG. 9 is the same as the sectional structure shown in FIG. 5 according to the first embodiment.

In the first embodiment shown in FIG. 2, the extending direction of the electrode line-shaped portions 31a of the pixel electrode 31 (also an extending direction of gaps 35) is parallel to the lateral direction of the sub-pixel P. However in this embodiment, the extending direction of the electrode line-shaped portions 31a has an angle to the lateral direction of the sub-pixel P. Hereinafter, the LCD according to this embodiment will be described in greater detail.

Figure 12B:
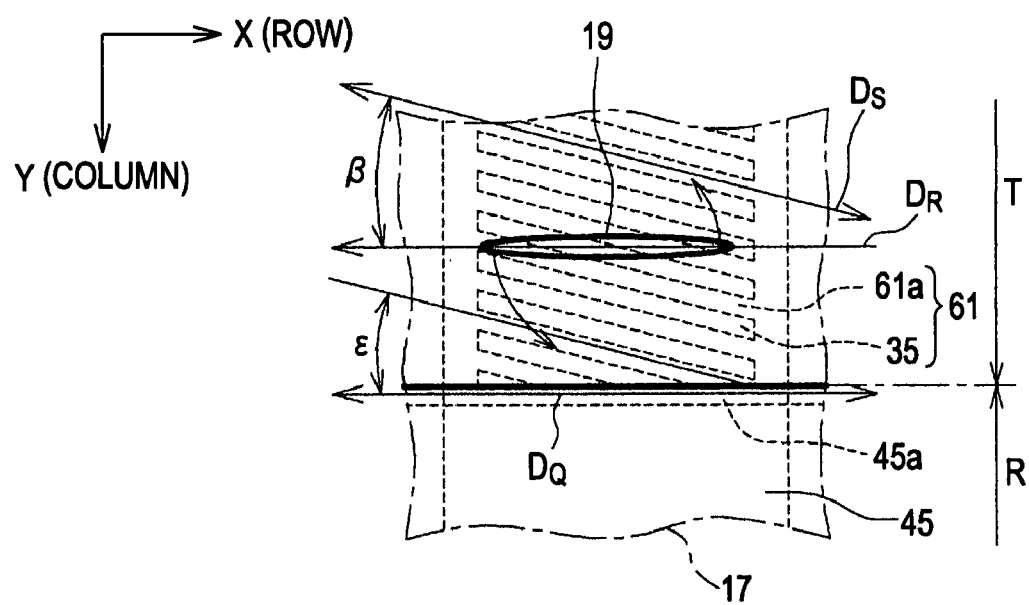

In this embodiment, the following conditions are set. This embodiment also refers FIG. 12B. FIG. 12B shows a region around a step plane 45a, inclined plane, shown in FIG. 9 in an enlarged manner. The view in FIG. 12B is viewed in a normal line direction of the substrate through the color filter substrate 9.

(1) In FIG. 9, a pixel electrode 61 has the transverse slit structure, but an angle ∈ of the extending direction of electrode line-shaped portion 61a of the pixel electrode 61 to the lateral direction of a sub-pixel P is 5°. The electrode line-shaped portions 61a extend slop down to the right in FIG. 9.

(2) In an orientation relational diagram of FIG. 9, the extending direction $D_S$ of the electrode line-shaped portion 61a and the extending direction $D_Q$ of the step plane 45a have an angle ∈ to each other and the angle ∈ is 5°. Accordingly, the extending direction $D_Q$ of the step plane 45a is parallel to the lateral direction X of the sub-pixel P.

(3) In the orientation relational diagram of FIG. 9, the rubbing direction $D_R$ and the extending direction $D_Q$ of the step plane 45a are parallel to each other. That is, an angle α between the rubbing direction $D_R$ and the extending direction $D_Q$ of the step plane 45a is 0°.

(4) The rubbing direction $D_R$ on the color filter substrate side shown in the orientation relational diagram of FIG. 9 is parallel to the rubbing direction (not shown) on the element substrate side but their directions are opposite (anti-parallel relationship).

(5) In FIG. 12B, an angle β between the rubbing direction $D_R$ and the extending direction $D_S$ of the electrode line-shaped portions 61a is 5°.

By the above-mentioned set conditions and by the same operations as in the first and second embodiments, it is possible to regulate in-plane movement, such as rotational locomotion or swing motion, of liquid crystal molecules 19 existing near the step plane 45a during an electric field application period by the step plane 45a. For this reason, the liquid crystal molecules 19 can easily return to the initial alignment state when the driving state of the LCD changes from a state in which a voltage is supplied to a state in which a voltage is not supplied. As a result, it is possible to prevent alignment failure from occurring near the step plane 45a, i.e. at the boundary between the reflective display region and the transmissive display region, and to prevent display contrast from deteriorating.

In this embodiment, the rubbing direction $D_R$ and the extending direction $D_Q$ of the step plane 45a are parallel to each other (an angle α between them is 0°). By this setting, it is possible to more securely perform alignment processing with respect to the step plane 45a than the case in which the extending direction $D_Q$ of the step plane 45a has a predetermined angle to the rubbing direction (for example, the first embodiment). As a result, it is possible to increase aligning force in the step plane 45a and thus it is possible to surely prevent alignment failure from occurring near the step plane 45a.

Liquid Crystal Device of Fourth Embodiment

Figure 10:
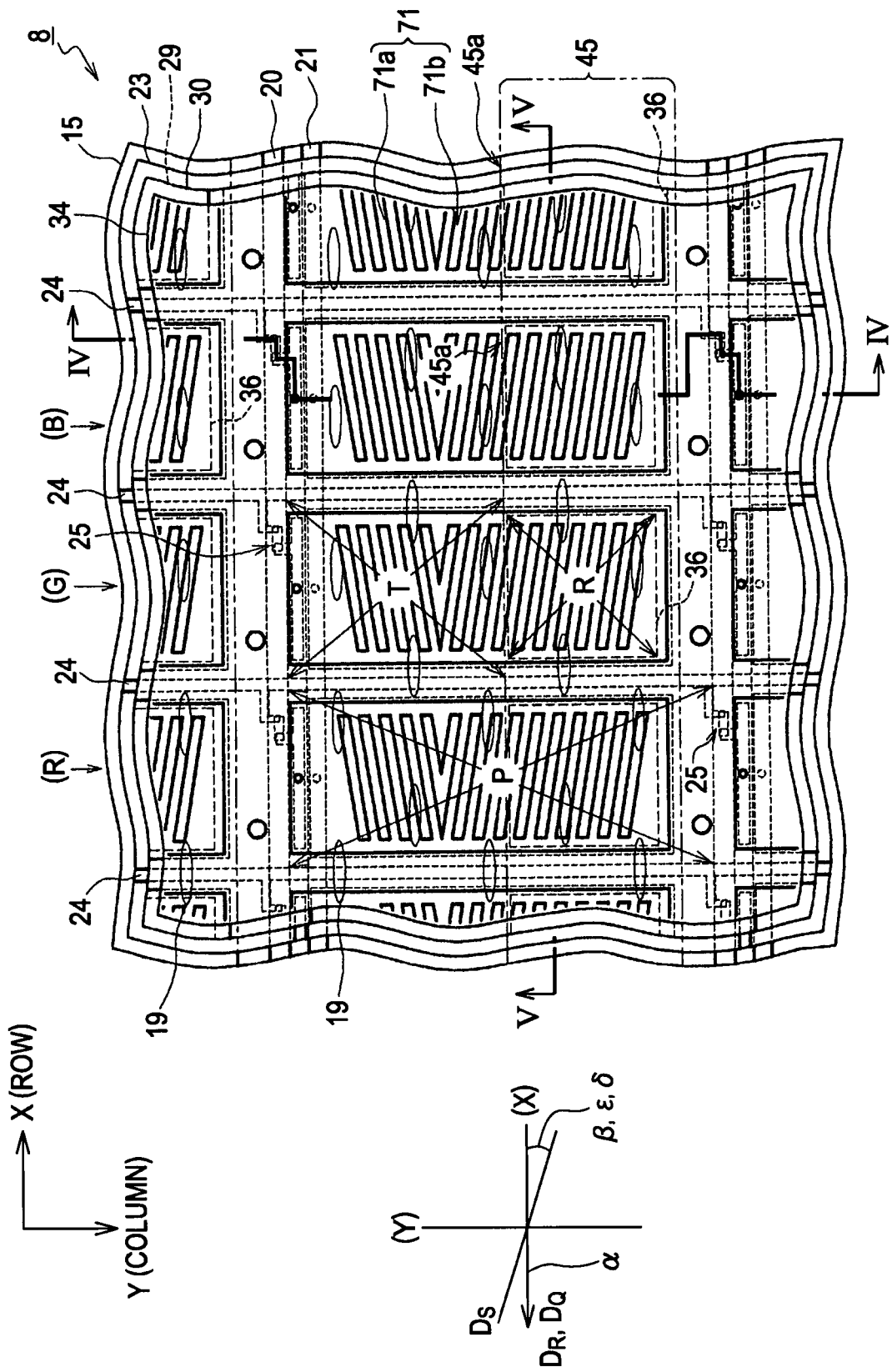
FIG. 10 is a plan view illustrating main part of an LCD according to a fourth embodiment, and more particularly a region around one pixel on one substrate.

FIG. 10 shows main part of an element substrate 8 of an LCD according to a fourth embodiment. In this figure, a color filter substrate is not shown but a layer thickness adjusting film 45 disposed on the color filter substrate is shown in a dotted line. In an orientation relational diagram shown on the left side of FIG. 10, a rubbing direction $D_R$ is a rubbing direction on the color filter substrate side for convenience's sake and has the anti-parallel relationship with a rubbing direction on the element substrate side.

The overall structure of the LCD according to the fourth embodiment is almost the same as that of the LCD according to the first embodiment shown in FIG. 1. The sectional structure of a sub-pixel, taken along the column direction Y of the sub-pixel P and along line IV-IV in FIG. 10, is the same as the structure shown in FIG. 4 according to the first embodiment. In FIG. 10, the sectional structure of a sub-pixel in row direction X, taken along line V-V is the same as the sectional structure shown in FIG. 5 according to the first embodiment.

In the first embodiment shown in FIG. 2, the extending direction $D_S$ of the electrode line-shaped portions 31a of the pixel electrode 31 (extending direction of the gaps 35) is parallel to the lateral direction of the sub-pixel P (row direction X) and all the electrode line-shaped portions 31a extend in the same direction in the sub-pixel P. However, in this embodiment, the extending directions of the electrode line-shaped portions disposed in the pixel electrode are different from the first embodiment. The pixel electrode has two domains in which extending directions of the electrode-line shaped portions are different. Hereinafter, the LCD according to this embodiment will be described in greater detail.

In this embodiment, the following conditions are set and this embodiment refers FIG. 12B. FIG. 12B is an enlarged view showing a region around a step plane 45a (the inclined surface) shown in FIG. 10, which is viewed in a normal line direction of the substrate through the color filter substrate 9. The structure shown in FIG. 12B is the same as the structure of the embodiment shown in FIG. 9.

(1) In FIG. 10, in an upper portion of the pixel electrode 71, electrode line-shaped portions 71a are formed so as to extend slope down to the left, and an angle δ of the extending direction of the electrode line-shaped portions 71a to the lateral direction (row direction X) of the sub-pixel P is about 5° in counter-clockwise direction. In a lower portion of the pixel electrode 71, electrode line-shaped portions 71b are formed so as to extend slop down to the right and an angle δ of the extending direction of the electrode line-shaped portion 71a to the lateral direction (row direction X) of the sub-pixel P is about 5° in counter-clockwise direction. Since the directions of slops of the electrode line-shaped portions 71a and 71b are set to be different from each other, the aligning directions (moving directions in a plane) of the liquid crystal molecules 19 in the sub-pixels P can be different (two different directions) when the electric field is applied to the liquid crystal layer. Thanks to different aligning directions, dependence of orientation angle characteristics on viewing angle characteristic in two domains in the sub-pixel P are offset, and thus it is possible to improve the viewing angle characteristic.

(2) In an orientation relational diagram of FIG. 10 or FIG. 12B, the extending direction $D_S$ of the electrode line-shaped portions 71b has an angle ∈ to the extending direction $D_Q$ of the step plane 45a and the angle ∈ is 5°.

(3) In FIG. 12B, the rubbing direction $D_R$ and the extending direction $D_Q$ of the step plane 45a are parallel to each other. That is, in the orientation relational diagram on the left side In FIG. 10, the rubbing direction $D_R$ and the extending direction $D_Q$ of the step plane 45a have an angle α to each other.

(4) In the orientation relational diagram shown in FIG. 10, the rubbing direction $D_R$ on the color filter substrate side and the rubbing direction on the element substrate side (not shown) have the anti-parallel relationship with each other.

(5) In FIG. 12B, the rubbing direction $D_R$ and the extending direction $D_S$ of the electrode line-shaped portions 71b have an angle β to each other, and the angle β is 5°.

Thanks to such conditions and the same actions as in the first to third embodiments, in-plane movement of the liquid crystal molecules 19 existing near the step plane 45a when an electric field is applied can be regulated by the step plane 45a. As a result, it is possible to prevent alignment failure from occurring near the step plane 45a, i.e. at a boundary between the reflective display region R and the transmissive display region T and also prevent display contrast from deteriorating.

Since the rubbing direction $D_R$ and the extending direction $D_Q$ of the step plane 45a are set to be parallel to each other (an angle α between them is 0°), it is possible to securely perform the alignment processing with respect to the step plane 45a like the third embodiment shown in FIG. 9. As a result, aligning force on the step plane 45a becomes stronger, and thus it is possible to prevent alignment failure from occurring near the step plane 45a.

Liquid Crystal Device of Fifth Embodiment

Figure 11:
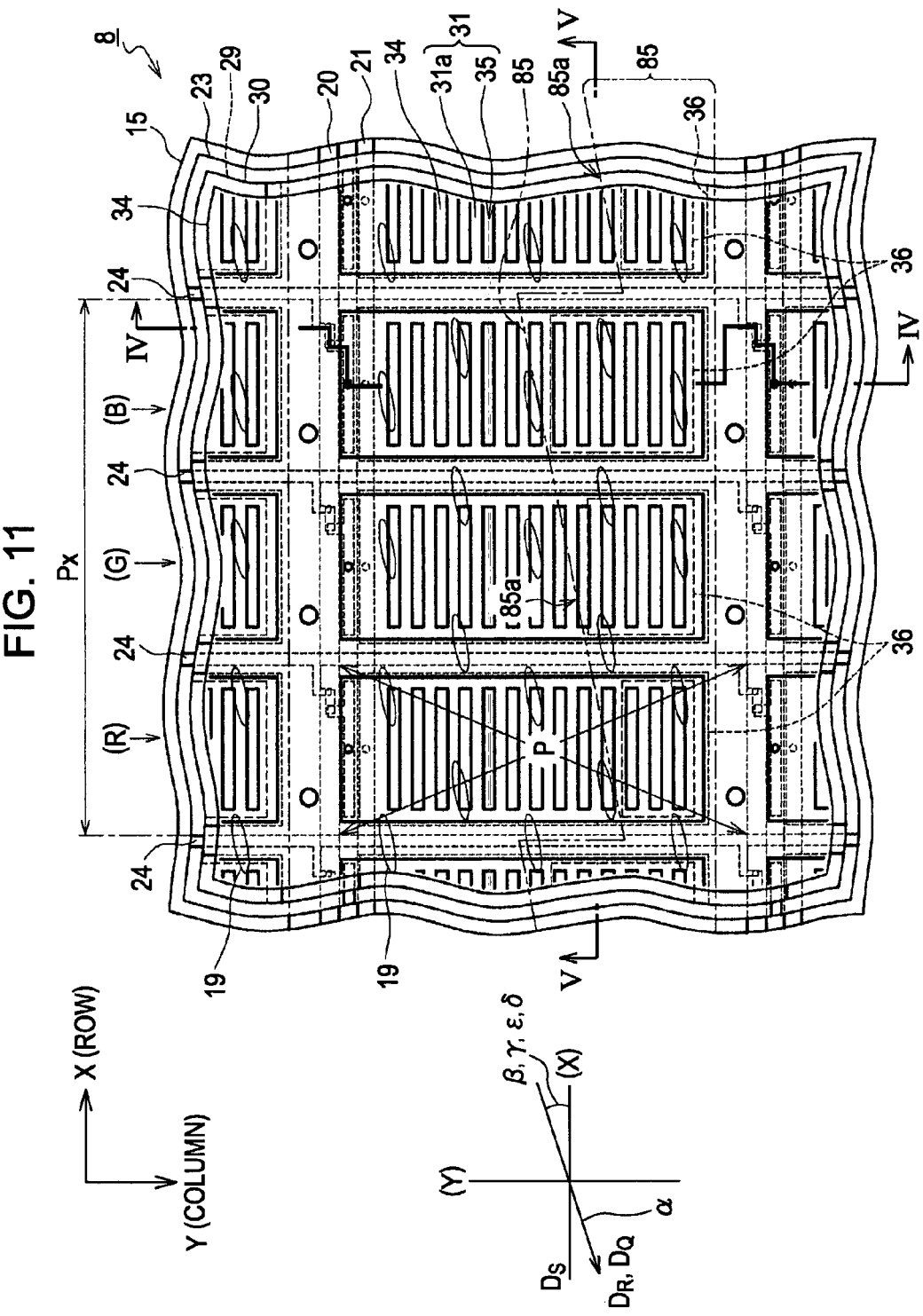
FIG. 11 is a plan view illustrating main part of an LCD according to a fifth embodiment, and more particularly a region around one pixel on one substrate.

FIG. 11 shows main part of an element substrate 8 used in an LCD according a fifth embodiment of the invention. A color filter substrate 9 is omitted in the figure but a layer thickness adjusting film 85 disposed on the color filter substrate 9 is shown in a dotted line. A rubbing direction $D_R$ in an orientation relational diagram shown on the left side in FIG. 11 is the rubbing direction on the color filter substrate side, which is reversely parallel to the rubbing direction on the element substrate side.

The overall structure of the LCD according to the fifth embodiment is the same as the structure of the LCD according to the first embodiment shown in FIG. 1. In the above-mentioned first to fourth embodiments, the layer thickness adjusting film having the same shape and size of the sub-pixel is provided to every sub-pixel. However, in this embodiment, the layer thickness adjusting film has the same shape and size as that of a single display pixel Px consisting of three sub-pixels corresponding to R, G, and B colors. That is, the layer thickness adjusting film has different shape and size from each of sub-pixels corresponding to R, G and B colors.

In this embodiment, the following conditions are set and the set conditions are explained with reference to FIG. 12A. FIG. 12A is an enlarged view showing around an inclined plane shown in FIG. 11, i.e. a step plane 85a, the view is taken in a normal line direction of the substrate through the color filter substrate 9. The structure shown in FIG. 12A is the same as that of the embodiment shown in FIG. 8.

(1) In FIG. 11, an extending direction of the electrode line-shaped portions 31a of the pixel electrode 31 is parallel to the lateral direction of the sub-pixel P. That is, the extending direction $D_S$ of the electrode line-shaped portions 31a and the lateral direction X of the sub-pixel P have an angle δ to each other and the angle δ is 0°.

(2) In orientation relational diagram of FIG. 11, the extending direction $D_S$ of the electrode line-shaped portion 31a and the extending direction $D_Q$ of the step plane 85a have an angle ∈ to each other and the angle ∈ is 5°.

(3) In orientation relational diagram of FIG. 11, the rubbing direction $D_R$ and the extending direction $D_Q$ of the step plane 85a are parallel to each other. That is, the rubbing direction $D_R$ and the extending direction $D_Q$ of the step plane 85a have an angle α to each other and the angle α is 0°.

(4) In the orientation relational diagram shown in FIG. 11, the rubbing direction $D_R$ on the color filter substrate side and the rubbing direction (not shown) on the element substrate side are reversely parallel to each other.

(5) In FIG. 12A, the extending direction $D_Q$ of the step plane 85a is inclined to the lateral direction (row direction X) of the sub-pixel P. In particular, the step plane 85a extends slope to the left in the figure. In the orientation relational diagram of FIG. 11, the extending direction $D_Q$ of the step plane 85a has an angle γ to the lateral direction (row direction X) of the sub-pixel P and the angle γ is 5°.

(6) In FIG. 12A, the rubbing direction $D_R$ and the extending direction $D_S$ of the electrode line-shaped portions 31a has an angle β to each other and the angle β is 5°.

(7) The layer thickness adjusting film 85 is disposed in a band form for each of every pixel Px which is the unit of display consisting of three sub-pixels. In greater detail, the step plane 85a of the layer thickness adjusting film 85 continuously extends in a line shape over the sub-pixel P of red color R, the sub-pixel P of green color Q and the sub-pixel of blue color B. The step plane 85a extends slope to the left at an angle of 5° to the lateral direction of the sub-pixel. Area of the light reflective film 36 on the element substrate 8 varies depending on the shape and size of the step plane 85a. That is, the sizes of the reflective display regions determined by the light reflective film 36 are different in sub-pixels P. In greater detail, the size of the reflective display region R is in the relationship of P(R)<P(G)<P(B).

Thanks to such set conditions, the LCD according to this embodiment acts like the LCDs according to the first to fourth embodiments. Accordingly, it is possible to control the in-plane movement of the liquid crystal molecules 19 near the step plane 85a during application of an electric field by the step plane 85a. As a result, it is possible to prevent alignment failure from occurring near the step plane 85a, i.e. at a boundary between the reflective display region R and the transmissive display region T, and also prevent display contrast from deteriorating.

In this embodiment, as shown in FIG. 11, the layer thickness adjusting film 85 is formed in the unit of a single pixel Px comprised of three sub-pixels of R, G, and B colors. That is, each unit of the layer thickness adjusting film 85 has the same shape and size as a single pixel Px. By this structure, unlike the case in which the layer thickness adjusting film 55 has a saw blade shape or a wedge shape in a plan view and is formed for each sub-pixel as in the embodiment shown in FIG. 8, the step portion is not formed in a manner such that the short edge of the layer thickness adjusting film 55 protrudes from the edge of the sub-pixel in the longitudinal direction Y at every boundary of all the sub-pixels P. Even in the case in which the step portions are formed, the step portions are provided for each pixel Px, a collection of three sub-pixels P. Accordingly, it is possible to suppress alignment failure in comparison with the case in which the step portion is provided for each sub-pixel.

Since the rubbing direction $D_R$ on the color filter substrate 9 and the extending direction $D_Q$ of the step plane 85a are parallel to each other (an angle α between both is 0°), it is possible to securely perform alignment processing on the step plane 85a as in the third embodiment shown in FIG. 9. As a result, it is possible to increase aligning force on the step plane 85 and thus it is possible to surely prevent alignment failure from occurring near the step plane 85a.

Other Embodiments

The invention is explained above with reference to preferred embodiments. However, the invention is not limited to the above-mentioned embodiments but may be modified in a variety of manners in the scope of claims.

For example, in all embodiments above, the operation mode of the LCDs is the FFS mode, but may be the IPS mode. In the structure using the IPS mode, the electrode line-shaped portions of the shared electrode and the electrode line-shaped portions of the pixel electrode are spaced apart from each other by a relatively large distance (for example, larger than a thickness of the liquid crystal layer) along the surface of the substrate. Accordingly, in the structure using this mode, it is difficult to generate an electric field on a region right above the pixel electrode. On the other hand, in the structure using the FFS mode, the electrode line-shaped portions of the pixel electrode overlap the shared electrode in a plan view, so that it is easy to generate an electric field even at a region right above the pixel electrode.

In the embodiments shown in FIGS. 8 and 11, the step planes 55a and 85a extend slop down to the left in these figures. However, the step planes 55a and 85a *may extend slop down to the right*.

In the embodiment shown in FIG. 8, in all sub-pixels P, the step planes extend at a slop in the same direction of slop, but the extending directions of the step planes may be different in different sub-pixels P. For example, in adjacent sub-pixels P, the directions of slops may be opposite. Alternatively, a single sub-pixel P is segmented into a plural segments, and directions of slop may be different in different segments.

In all of these embodiments, in every sub-pixel P, it is required that the in-plane movement of the liquid crystal molecules 19 existing near the boundary between the reflective display region R and the transmissive display region T is regulated by the step plane during an electric field application period.

Electronic Apparatus of First Embodiment

Figure 13:
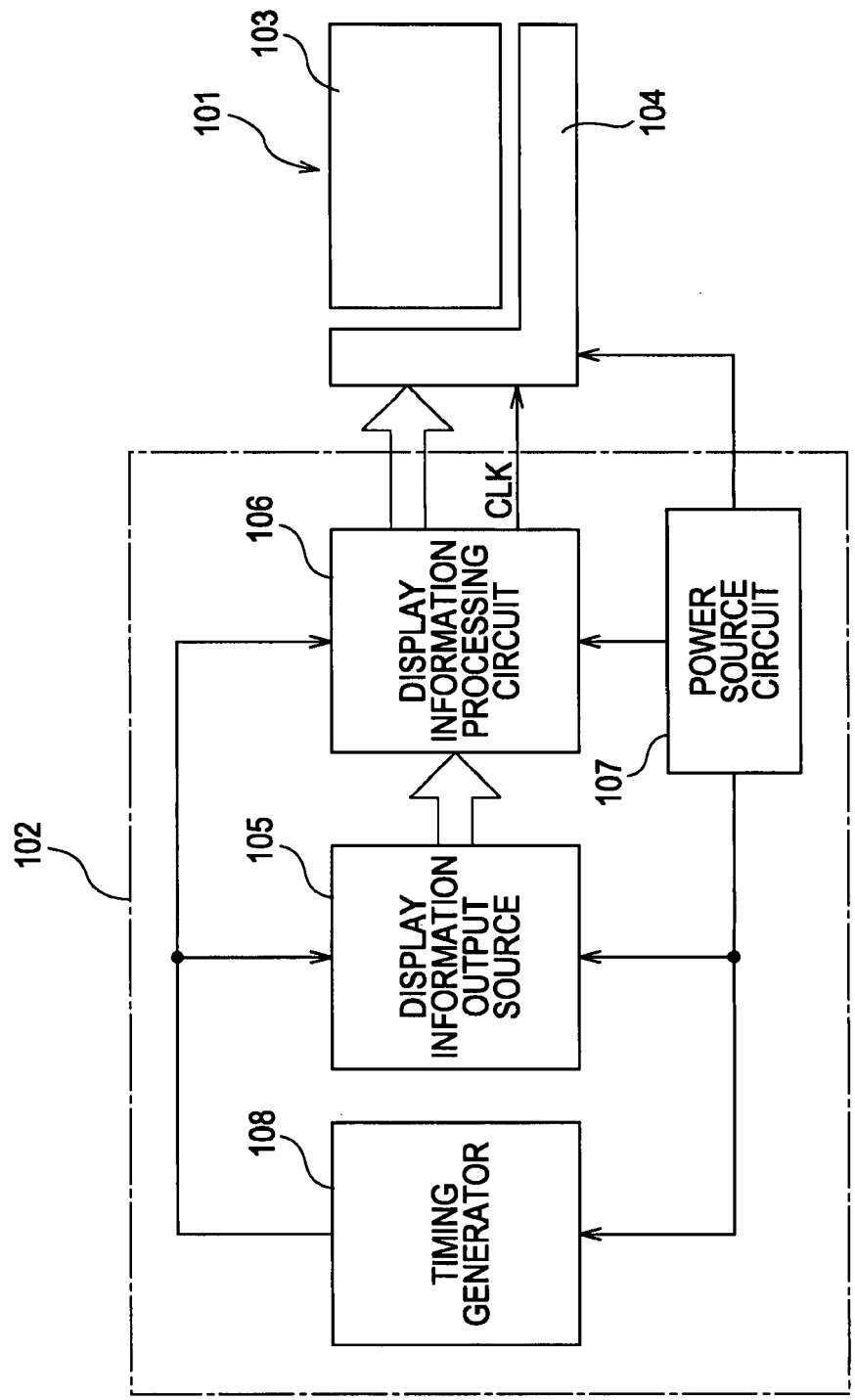
FIG. 13 is a block diagram illustrating an electronic apparatus according to a sixth embodiment of the invention.

Hereinafter, an electronic apparatus according to a first embodiment of the invention will be described. This embodiment is an example of the invention and the invention is not limited to this embodiment. FIG. 13 shows an electronic apparatus according to the first embodiment of the invention. The electronic apparatus includes a liquid crystal device 101 and a control circuit 102 which controls the liquid crystal device 101. The liquid crystal device 101 includes a liquid crystal panel 103 and a driving circuit 104. The control circuit 102 includes a display information output source 105, a display information processing circuit 106, a power source circuit 107 and a timing generator 108.

The display information output source 105 includes a memory such as random access memory (RAM), a storage unit such as a variety of disks, and a synchronizing circuit which outputs a digital image signal in synchronized manner. The display information output source 105 supplies display information such as image signal in a predetermined format to the display information processing circuit 106 on the basis of a variety of clock signals generated by the timing generator 108.

The display information processing circuit 106 includes a plurality of known circuits including an amplifying and inverting circuit, a rotation circuit, a gamma correction circuit, and a clamp circuit. The display information processing circuit 106 performs processing of display information which is input and supplies an image signal and clock signals CLS together to the driving circuit 104. Here, the driving circuit 104 includes a scan line driving circuit and a data line driving circuit and these driving circuits are collectively termed a check circuit. The power source circuit 107 supplies a predetermined power source voltage to every element.

The liquid crystal device 101 is constructed utilizing the liquid crystal device 1 shown in FIG. 1. According to this liquid crystal device 1, it is possible to regulate the movement of liquid crystal molecules existing near the step plane of the layer thickness adjusting film during an electric field application period and to prevent display contrast from deteriorating owing to weak aligning force of the liquid crystal molecules on the step plane by setting the aligning direction of the liquid crystal molecules, the extending direction of the step plane of the liquid crystal layer thickness adjusting film, and the extending direction of the electrode line-shaped portions of the pixel electrode to have an angle in a predetermined range to each other. Accordingly, in the electronic apparatus constructed by utilizing the liquid crystal device 1, it is possible to display contrast from deteriorating and thus it is possible to achieve higher quality of image display.

Electronic Apparatus of Second Embodiment

Figure 14:
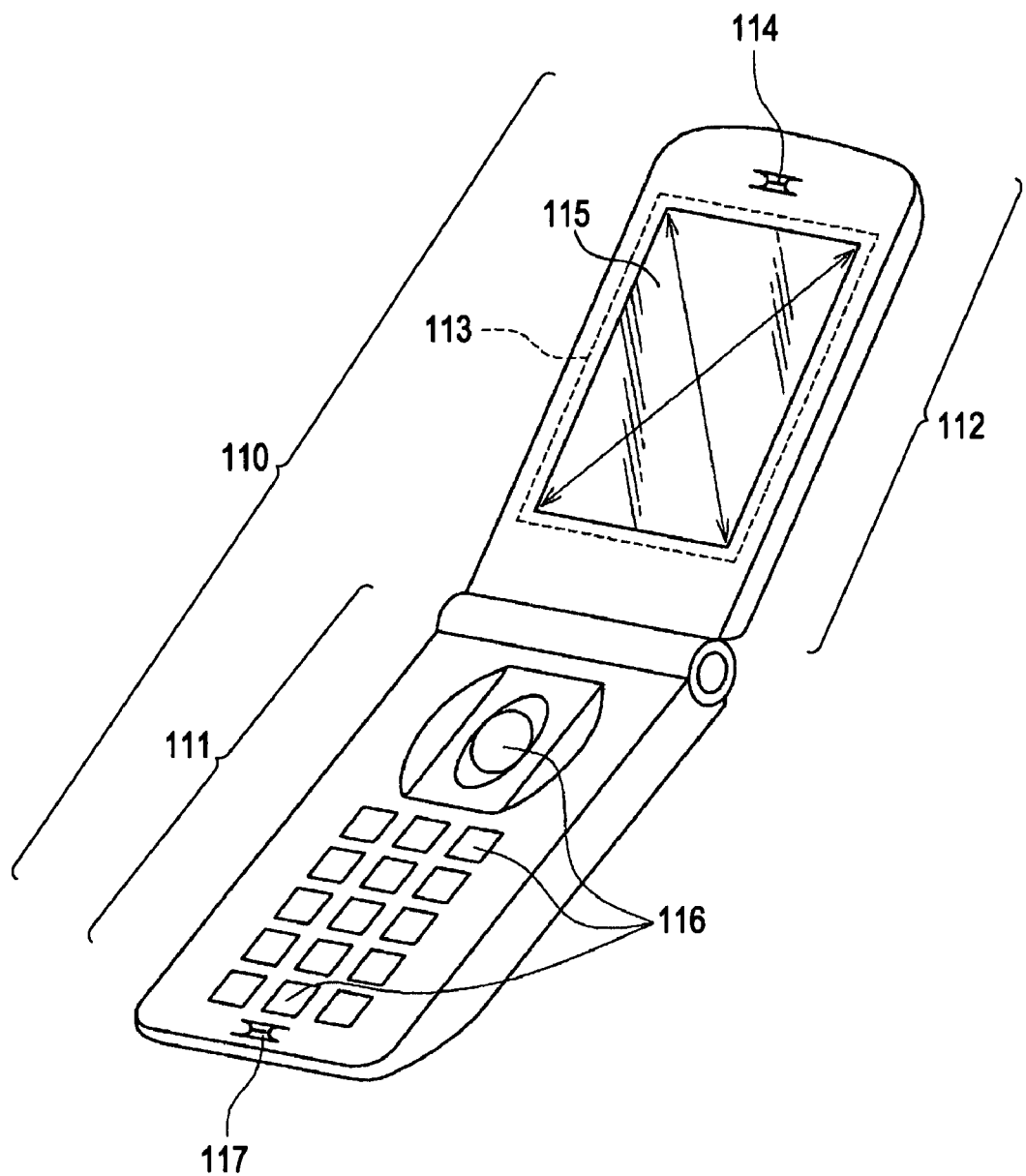
FIG. 14 is a perspective view illustrating an electronic apparatus according to the sixth embodiment.

FIG. 14 shows a cellular phone which is an electronic apparatus according to a second embodiment. The cellular phone 110 includes a main body portion 111 and a display body portion 112 which can be opened and closed with respect to the main body portion 111. The display body portion 112 has a display device 113 and a receiver portion 114. A variety of displays in association with telephone communications is displayed on a display screen 115 of the display device 113. A control portion which controls operations of the display device 113 is mounted in the main body portion 111 or the display body portion 112 as part of the control portion which controls the whole of the cellular phone or as separated part from the control portion. The main body portion 111 has a manipulation button 116 and a transmitter portion 117.

The display device 113 can be constructed by utilizing the liquid crystal device 1 shown in FIG. 1. According to the liquid crystal device 1, it is possible to regulate the movement of liquid crystal molecules existing near the step plane of the layer thickness adjusting film during an electric field application period and to prevent display contrast from deteriorating owing to weak aligning force of the liquid crystal molecules on the step plane by setting the aligning direction of the liquid crystal molecules, the extending direction of the step plane of the liquid crystal layer thickness adjusting film, and the extending direction of the electrode line-shaped portions of the pixel electrode to have an angle in a predetermined range to each other. Accordingly, in the electronic apparatus constructed using the liquid crystal device 1, it is possible to display contrast from deteriorating and thus it is possible to achieve higher quality of image display.

Electronic Apparatuses of Other Embodiments

The electronic apparatus of the invention is explained with reference to the above embodiments but the invention is not limited to the embodiments and may be modified in a variety of ways in the scope of claims. For example, the electronic apparatus of the invention is not limited to the cellular phone but may be applied to a personal computer, a liquid crystal television, a viewfinder-type or monitor-type video recorder, a car navigation device, a pager, an electronic organizer, a calculator, a word processor, a workstation, a video-conferencing phone, a POS terminal, a digital still camera, an electronic book, or the like.

What is claimed is:

1. A liquid crystal device, comprising:
a first substrate and a second substrate facing each other;
a liquid crystal layer disposed between the first substrate and the second substrate;
an aligning film which is disposed on a liquid crystal layer side surface of the second substrate and on which a rubbing processing is performed;
a plurality of sub-pixels arranged in planar regions of the first substrate and the second substrate;
source lines extending in a first direction;
gate lines extending in a second direction that is perpendicular to the first direction; and
a first electrode and a second electrode which are disposed on a liquid crystal layer side surface of the first substrate and which generate an electric field therebetween,
wherein the second electrode includes a plurality of electrode line-shaped portions extending in the second direction, arranged in parallel to each other, and spaced apart from each other, wherein each sub-pixel includes a reflective display region in which a light reflective film is disposed and a transmissive display region in which a light reflective film is not disposed, wherein a layer thickness adjusting film, which allows the liquid crystal layer to have different layer thicknesses in the reflective display region and in the transmissive display region, is disposed between the second substrate and the aligning film, wherein the layer thickness adjusting film is disposed in a band form over a plurality of sub-pixels and extends in the second direction, the layer thickness adjusting film having a step portion with a step plane extending in a thickness direction of the layer thickness adjusting film near boundary portions between the reflective display region and the transmissive display region, wherein an angle between a rubbing direction in which a rubbing processing is performed and an extending direction of a boundary between the reflective display region and the transmissive display region is defined as α, $0° \leq α \leq 20°$, wherein ends of liquid crystal molecules, which are on a leading side of rubbing, are arranged so as to direct toward the step plane when a voltage is applied across the first electrode and the second electrode, and wherein the electrode line-shaped portions and the step plane extend in the second direction which is parallel to a lateral direction of the sub-pixels and parallel to the boundaries between the reflective display regions and the transmissive display regions, and an angle between the rubbing direction and the extending direction of the electrode line-shaped portion is defined as β, $5° \leq β \leq 20°$.

2. The liquid crystal display according to claim 1, wherein liquid crystals have a positive dielectric anisotropy, wherein the transmissive display region and the reflective display region are arranged in a longitudinal direction of each sub-pixel, and wherein the extending direction of the electrode line-shaped portions has an angle to a lateral direction of the sub-pixels in a plan view viewed in a direction from a liquid crystal layer side, in which the angle is in a range from 0° to 45° in clockwise direction or in a range from 0° to 45° in counter-clockwise direction.

3. The liquid crystal device according to claim 1, wherein the rubbing processing is performed in a direction approaching the step plane from an opposite side of the step plane.

4. The liquid crystal display according to claim 1, wherein when an angle between the rubbing direction and the extending direction of the step plane is defined as α, α=0°.

5. The liquid crystal device according to claim 4, wherein when an angle between the electrode line-shaped portion and the lateral direction of the sub-pixel is defined as δ, δ=0°, wherein when an angle between the extending direction of the electrode line-shaped portion and the extending direction of the step plane is defined as ∈, $5° \leq ∈ \leq 20°$ and wherein the angle α between the rubbing direction and the extending direction of the step plane is 0°.

6. The liquid crystal device according to claim 4, wherein when an angle between the electrode line-shaped portion and the lateral direction of the sub-pixel is defined as δ, $5° \leq δ \leq 20°$, wherein when an angle between the electrode-line shaped portion and the extending direction of the step plane is defined as ∈, $5° \leq ∈ \leq 20°$, and wherein the angle α between the rubbing direction and the extending direction of the step plane is 0°.

7. The liquid crystal device according to claim 4, wherein the second electrode includes two domains in which inclined directions of the electrode line-shaped portions in different domains are different from each other, in which the electrode line-shaped portions have an angle in clockwise direction to the lateral direction of the sub-pixel in a plan view viewed in a direction from a liquid crystal layer side in either one domain of the two domains, and the electrode line-shaped portions have an angle in counter-clockwise direction to the lateral direction of the sub-pixel in a plan viewed in a direction from the liquid crystal layer side in the other domain of the two domains, wherein an angle δ between the electrode line-shaped portion and the lateral direction of the sub-pixel is in a range expressed by $5° \leq δ \leq 20°$, wherein an angle ∈ between an extending direction of the electrode line-shaped portion and an extending direction of the step plane is in a range expressed by $5° \leq ∈ \leq 20°$, and wherein the angle α between the rubbing direction and the extending direction of the step plane is 0°.

8. The liquid crystal device according to claim 4, wherein one pixel includes sub-pixels having colored films of different colors, which are arranged in the lateral direction of the sub-pixel, wherein the layer thickness adjusting film is formed so as to have a shape corresponding to each pixel, wherein an angle δ between the electrode line-shaped portion and the lateral direction of the sub-pixel is in a ranged expressed by $5° \leq δ \leq 20°$, wherein an angle ∈ between an extending direction of the electrode line-shaped portion and an extending direction of the step plane is in a range expressed by $5° \leq ∈ \leq 20°$, wherein the angle α between the rubbing direction and an extending direction of the step plane is 0°, and wherein the step plane extends in a straight line form in one pixel.

9. The liquid crystal device according to claim 1, wherein the step plane is an inclined plane where a layer thickness of the layer thickness adjusting film continuously changes.

10. The liquid crystal device according to claim 1, wherein the first electrode is a plane-shaped electrode having a portion overlapping the electrode line-shaped portion of the second electrode.

11. The liquid crystal device according to claim 1, wherein layer thickness adjusting film is formed including a phase shifting film, and a retardation value Δnd of the phase shifting film is a half wavelength.

12. An electronic apparatus having the liquid crystal device according to claim 1.

13. The liquid crystal display according to claim 2, wherein the angle to a lateral direction of the sub-pixels in a plan view viewed in a direction from a liquid crystal layer side is not equal to 0°.

14. The liquid crystal display according to claim 9, wherein the step plane is disposed in an area that does not overlap the light reflective film reflection in plan view.

15. The liquid crystal display according to claim 1, wherein the angle between the rubbing direction and all of the boundaries between the reflective display region and the transmissive display region is $0° \leq α \leq 20°$.

16. A liquid crystal device, comprising:
a first substrate and a second substrate facing each other;
a liquid crystal layer disposed between the first substrate and the second substrate;
an aligning film which is disposed on a liquid crystal layer side surface of the second substrate and on which a rubbing processing is performed;
a plurality of sub-pixels arranged in planar regions of the first substrate and the second substrate; and
source lines extending in a first direction;

gate lines extending in a second direction that is perpendicular to the first direction; and a first electrode and a second electrode disposed on a liquid crystal layer side surface of the first substrate and which generates an electric field therebetween;

wherein the second electrode includes a plurality of electrode line-shaped portions extending in the second direction, arranged in parallel to each other and spaced apart from each other, wherein each sub-pixel includes a reflective display region in which a light reflective film is disposed and a transmissive display region in which a light reflective film is not disposed, wherein a layer thickness adjusting film which intends to make the liquid crystal layer have different layer thicknesses in the reflective display region and the transmissive display layer is disposed between the second substrate and the aligning film, wherein the layer thickness adjusting film is disposed in a band form over a plurality of sub-pixels and extends in the second direction, the layer thickness adjusting film having a step portion having a step plane extending in a thickness direction of the layer thickness adjusting film near boundary portions of the reflective display region and the transmissive display region, wherein an angle between a rubbing direction and an extending direction of a boundary between the reflective display region and the transmissive display region is defined as $\alpha$, $0°\leq\alpha\leq 20°$, wherein the step plane is disposed at a position where ends of liquid crystal molecules, which are disposed on a leading side in a rubbing direction and move when a voltage is applied across the first electrode and the second electrode in the transmissive display region, abut against, and wherein the electrode line-shaped portions and the step plane extend in the second direction which is parallel to a lateral direction of the sub-pixels and parallel to the boundaries between the reflective display regions and the transmissive display regions, and an angle between the rubbing direction and the extending direction of the electrode line-shaped portion is defined as $\beta$, $5°\leq\beta\leq 20°$.

17. A liquid crystal device, comprising:

a first substrate and a second substrate facing each other;

a liquid crystal layer disposed between the first substrate and the second substrate;

an aligning film on which a rubbing processing is performed and which is disposed on a liquid crystal layer side surface of the second substrate;

a plurality of sub-pixels arranged in planar regions of the first substrate and the second substrate, source lines extending in a first direction;

gate lines extending in a second direction that is perpendicular to the first direction; and a first electrode and a second electrode disposed on a liquid crystal side surface of the first substrate and which generates an electric field therebetween, wherein the second electrode has a plurality of electro line-shaped portions extending in the second direction, arranged in parallel with each other, and spaced apart from each other, wherein each sub-pixel includes a reflective display region in which a light reflective film is disposed and a transmissive display region in which the light reflective film is not disposed, wherein a layer thickness adjusting film is disposed in a band form over a plurality of sub-pixels and extends in the second direction, the layer thickness adjusting film being formed between the second substrate and the aligning film in order to make the liquid crystal layer have different layer thicknesses in the reflective display region and in the transmissive display region different, wherein the layer thickness adjusting film has a step portion having a step plane extending in a layer thickness direction of the layer thickness adjusting film near boundary portions of the reflective display region and the transmissive display region, wherein an angle between a rubbing direction and an extending direction of boundaries between the reflective display region and the transmissive display region is defined as $\alpha, 0°\leq\alpha\leq 20°$, wherein liquid crystal molecules in the liquid crystal layer are initially aligned at a pre-tilt angle to a surface of the aligning film, and wherein the step plane is arranged at a position where ends of the liquid crystal molecules, which are separated from the surface of the aligning film, of both ends of the liquid crystal molecules aligned at the pre-tilt angle when an electric field is generated between the first electrode and the second electrode, move in the transmissive display region, and wherein the electrode line-shaped portions and the step plane extend in the second direction which is parallel to a lateral direction of the sub-pixels and parallel to the boundaries between the reflective display regions and the transmissive display region, and an angle between the rubbing direction and the extending direction of the electrode line-shaped portion is defined as $\beta$, $5°\leq\beta\leq 20°$.

* * * * *